United States Patent
Ojiro et al.

(10) Patent No.: US 9,007,653 B2
(45) Date of Patent: Apr. 14, 2015

(54) IMAGE PROCESSING APPARATUS AND IMAGE PROCESSING METHOD FOR PRINTING AN IMAGE USING COLORED INK AND CLEAR LIQUID

(71) Applicant: Canon Kabushiki Kaisha, Tokyo (JP)

(72) Inventors: Hinako Ojiro, Wynnewood, PA (US); Takeshi Yazawa, Yokohama (JP); Kei Yoshizawa, Yokohama (JP); Makoto Torigoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 13/872,598

(22) Filed: Apr. 29, 2013

(65) Prior Publication Data

US 2013/0301066 A1    Nov. 14, 2013

(30) Foreign Application Priority Data

May 8, 2012    (JP) ................................. 2012-106987

(51) Int. Cl.
*H04N 1/60*    (2006.01)
*G06K 15/02*    (2006.01)
*B41J 2/21*    (2006.01)

(52) U.S. Cl.
CPC ........... *G06K 15/1878* (2013.01); *B41J 2/2114* (2013.01); *G06K 2215/0082* (2013.01)

(58) Field of Classification Search
CPC .............. B41J 2/2114; G06K 15/1878; G06K 2215/0082
USPC ........................................ 358/1.9; 347/15, 98
See application file for complete search history.

(56) References Cited

U.S. PATENT DOCUMENTS

| | | | |
|---|---|---|---|
| 5,898,443 A | 4/1999 | Yoshino et al. | |
| 6,341,833 B1 * | 1/2002 | Liu et al. | 347/15 |
| 6,834,948 B2 * | 12/2004 | Asano et al. | 347/102 |
| 8,240,835 B2 * | 8/2012 | Iwao | 347/100 |

(Continued)

FOREIGN PATENT DOCUMENTS

JP    2002-307755 A    10/2002

OTHER PUBLICATIONS

U.S. Appl. No. 13/871,481; Inventor: Takeshi Yazawa; filed Apr. 26, 2013.

(Continued)

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

Provided is an ink jet printing apparatus that, without causing an increase in apparatus size, can print an image having high evenness in both of image clarity and glossiness regardless a gradation or gamut of the image. For this purpose, on the basis of input image data, pieces of multivalued color data respectively corresponding to colored inks, and first multivalued data and second multivalued data that correspond to image enhancing liquid are generated. On a print medium, the colored inks and the image enhancing liquid according to the first multivalued data are printed at nearly the same timing, and after the printing of them has been completed, the image enhancing liquid according to the second multivalued data is printed. In doing so, gloss properties appearing on the print medium can be made to fall within certain ranges, respectively, independently of input image data.

23 Claims, 22 Drawing Sheets

(56) References Cited

U.S. PATENT DOCUMENTS

| | | | |
|---|---|---|---|
| 2003/0099492 A1* | 5/2003 | Maeyama et al. | 399/302 |
| 2005/0122353 A1* | 6/2005 | Yamazaki et al. | 347/9 |
| 2011/0222126 A1* | 9/2011 | Asai et al. | 358/3.06 |
| 2011/0242176 A1* | 10/2011 | Iritani et al. | 347/15 |
| 2012/0050365 A1* | 3/2012 | Konno et al. | 347/14 |
| 2012/0050370 A1 | 3/2012 | Iritani et al. | |
| 2012/0050400 A1 | 3/2012 | Takahashi et al. | |
| 2012/0139984 A1* | 6/2012 | Lang | 347/15 |
| 2013/0084439 A1 | 4/2013 | Ojiro et al. | |
| 2013/0120801 A1* | 5/2013 | Shibasaki et al. | 358/3.24 |

OTHER PUBLICATIONS

U.S. Appl. No. 13/886,312; Inventor: Hinako Ojiro; filed May 3, 2013.

* cited by examiner

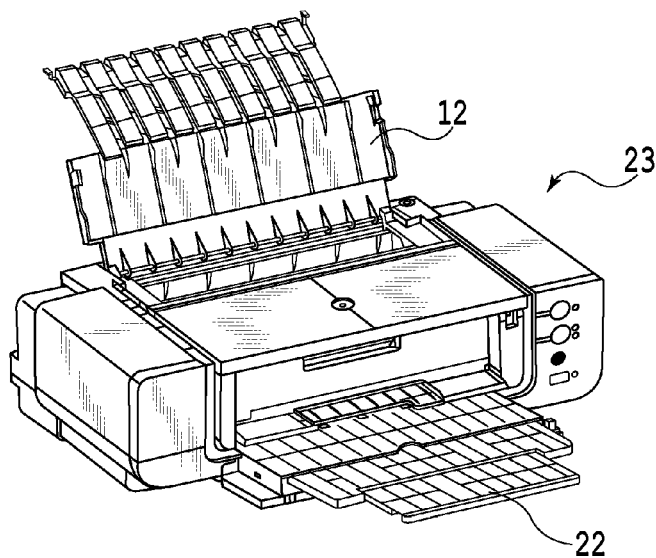
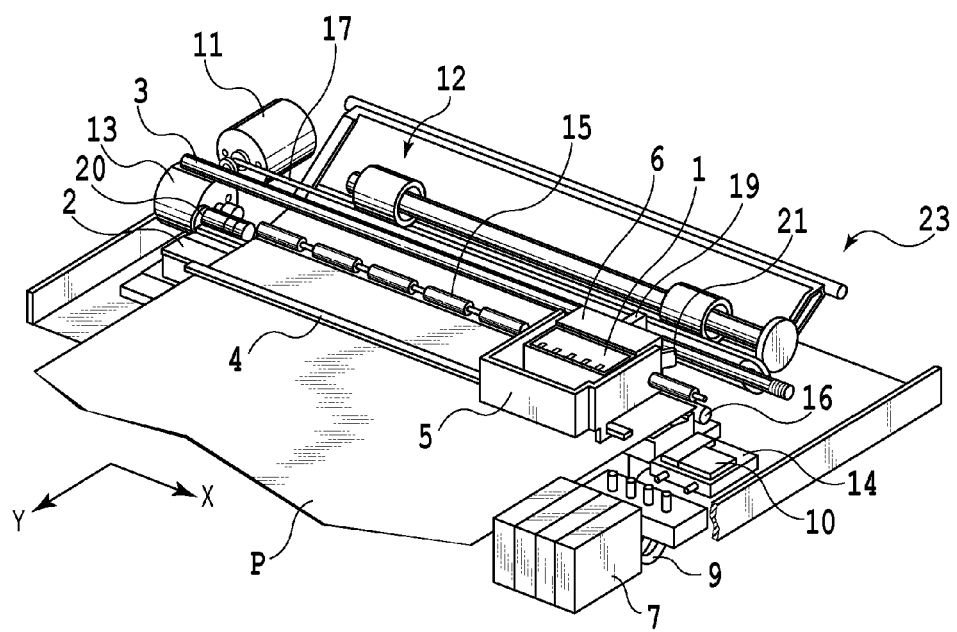

|  |  | INK | | | | | |
|---|---|---|---|---|---|---|---|
|  |  | 1 | 2 | 3 | 4 | 5 | 6 |
| PIGMENT DISPERSION LIQUID | 1 | 40 |  |  |  |  |  |
|  | 2 |  | 8 |  |  |  |  |
|  | 3 |  |  | 20 |  |  |  |
|  | 4 |  |  |  | 8 |  |  |
|  |  |  |  |  |  | 40 | 40 |
| GLYCERIN |  | 5.0 | 5.0 | 5.0 | 5.0 | 5.0 | 5.0 |
| DIETHYLENE GLYCOL |  | 5.0 | 5.0 | 5.0 | 5.0 | 5.0 | 5.0 |
| POLYETHYLENE GLYCOL 1000 |  | 5.0 | 5.0 | 5.0 | 5.0 | 5.0 | 5.0 |
| SURFYNOL 465 |  | 1.0 | 1.0 | 1.0 | 1.0 | 1.0 | 1.0 |
| ION-EXCHANGED WATER |  | 44 | 76 | 64 | 76 | 44 | 44 |

FIG.4

|  | IMAGE CLARITY | | GLOSSINESS | |
|---|---|---|---|---|
| HIGHLIGHT PART | A | INTERMEDIATE+ | D | INTERMEDIATE |
| | A | INTERMEDIATE+ | LOW | |
| INTERMEDIATE GRADATION PART | B | INTERMEDIATE+ | E | INTERMEDIATE |
| | B | INTERMEDIATE | HIGH+ | |
| SHADOW PART | C | INTERMEDIATE | F | INTERMEDIATE |
| | C | INTERMEDIATE | HIGH | |

FIG.15

IMAGE PROCESSING APPARATUS AND IMAGE PROCESSING METHOD FOR PRINTING AN IMAGE USING COLORED INK AND CLEAR LIQUID

BACKGROUND OF THE INVENTION

1. Field of the Invention

The present invention relates to an image processing apparatus that uses colored ink and image enhancing liquid to print an image on a print medium. In particular, the present invention relates to a technique for, in the case of using ink contained pigment as color material, improving gloss unevenness within an image.

2. Description of the Related Art

In the past, there has been widely known an ink jet printing apparatus that uses dye ink to enable the formation of a high-quality image having high color reproducibility. On the other hand, in recent years, the need for an ink jet printing apparatus using pigment ink having higher image fastness than the dye ink has been increasing. However, the pigment ink has a problem that color material tends to be unlikely to permeate into a print medium, and therefore in particular, in the case of printing on a glossy print medium, a degree of gloss is different between a print part and a non-print part of an image, and therefore gloss unevenness is likely to occur.

For such a problem of gloss unevenness, for example, there is invented a method that laminates a transparent film on a print surface. Also, there is proposed a method that adds an additive such as titanium dioxide to colored ink.

On the other hand, Japanese Patent Laid-Open No. 2002-307755 discloses a method that, in addition to pigment ink, uses colorless and transparent, or white colored image enhancing liquid to form an image. According to Japanese Patent Laid-Open No. 2002-307755, there is disclosed a method that detects print or non-print of the pigment ink on a pixel basis to print the image enhancing liquid on non-print pixels, and thereby conforms glossiness of pixels printed with the image enhancing liquid to glossiness of pixels printed with the pigment ink to reduce gloss unevenness.

However, in the method that laminates the transparent film, a laminate mechanism is required, so that an apparatus is increased in size, and to do the laminating work, time and effort are spent. Also, in the method that adds the additive such as titanium dioxide to the colored ink, ejection stability in a print head becomes a problem.

As disclosed in Japanese Patent Laid-Open No. 2002-307755, the method that applies the image enhancing liquid on areas where the colored ink is not printed can make a sense of glossiness nearly uniform at some gradations but may not sufficiently solve the gloss unevenness depending on a gradation. This is because the gloss unevenness perceived by a person is influenced not only by glossiness of printed material but also by image clarity of the printed material, and therefore difference in image clarity appears between the highlight areas where the colored ink is hardly applied and dark areas where a large amount of colored ink is applied, for example. That is, unless both of the glossiness and the image clarity are nearly uniform, the gloss unevenness may be perceived.

SUMMARY OF THE INVENTION

The present invention is made in order to solve the above-described problems. Therefore, an object of the present invention is, without causing an increase in apparatus size, to provide an image processing apparatus that can print an image having high evenness in both image clarity and glossiness regardless of a gradation or gamut of the image.

In a first aspect of the present invention, there is provided an image processing apparatus for printing an image on a unit area of print medium by using a colored ink and clear liquid according to image data of the image corresponding to the unit area, the image processing apparatus comprising: a generation unit configured to, on a basis of the image data corresponding to the unit area, generate multivalued color data corresponding to the colored ink, and first multivalued data and second multivalued data that correspond to the clear liquid; a binarization unit configured to binarize the multivalued color data to generate binary color data, binarize the first multivalued data to generate first binary data, and binarize the second multivalued data to generate second binary data; and a determination unit configured to determine timing to print the colored ink and the clear liquid on the print medium respectively according to the binary color data, the first binary data, and the second binary data, wherein the determination unit determines the timing to print the colored ink and the clear liquid on the print medium such that printing of the clear liquid according to the first binary data is performed at a timing before printing of the colored ink according to the binary color data is performed, and after the printing according to the binary color data and the printing according to the first binary data on the print medium have been performed, printing of the clear liquid according to the second binary data is performed.

In a second aspect of the present invention, there is provided an image processing method for printing an image on a unit area of print medium by using a colored ink and clear liquid according to image data of the image corresponding to the unit area, the image processing method comprising: a generation step of, on a basis of the input image data corresponding to the unit area, generating multivalued color data corresponding to the colored ink, and first multivalued data and second multivalued data that correspond to the clear liquid; a binarization step of binarizing the multivalued color data to generate binary color data, binarizing the first multivalued data to generate first binary data, and binarizing the second multivalued data to generate second binary data; and a determination step of determining timing to print the colored ink and the clear liquid on the print medium respectively according to the binary color data, the first binary data, and the second binary data, wherein the determination step determines the timing to print the colored ink and the clear liquid on the print medium such that printing of the clear liquid according to the first binary data is performed at a timing before printing of the colored ink according to the binary color data is performed, and after the printing according to the binary color data and the printing according to the first binary data on the print medium have been performed, printing of the clear liquid according to the second binary data is performed.

Further features of the present invention will become apparent from the following description of exemplary embodiments (with reference to the attached drawings).

BRIEF DESCRIPTION OF THE DRAWINGS

FIGS. 1A and 1B are appearance and internal structure diagrams of an ink jet printing apparatus;

FIG. 4 is a diagram illustrating component distributions for preparing six types of colored inks;

FIG. 15 is a diagram illustrating effects of the present invention with relating the effects to the print states;

DESCRIPTION OF THE EMBODIMENTS (First Embodiment)

Figure 2:
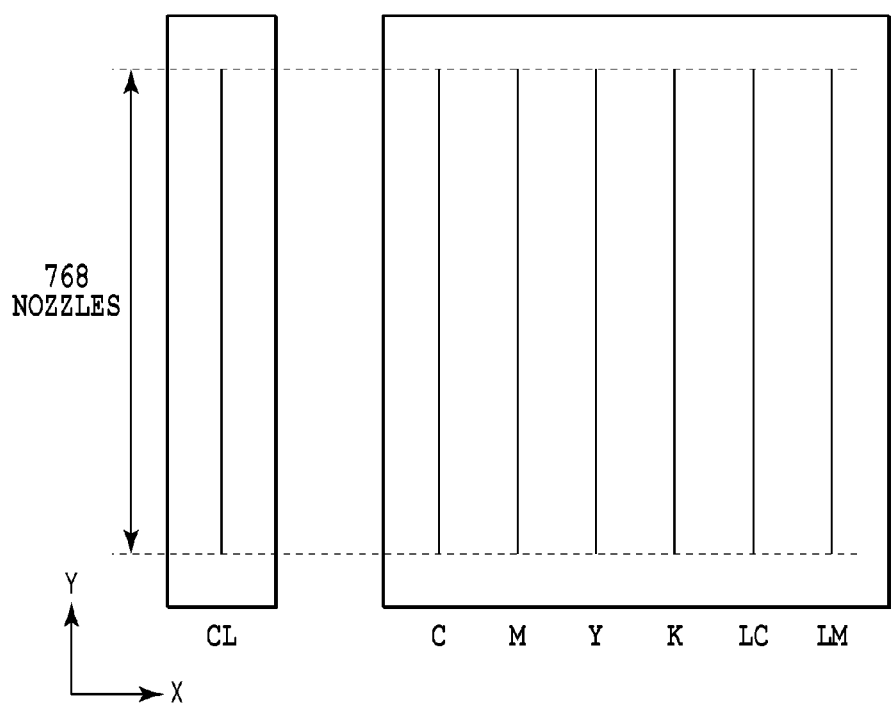
FIG. 2 is a diagram illustrating an arrangement state of nozzle arrays in a print head.

In the following, an embodiment of the present invention is described in detail.

FIGS. 1A and 1B are appearance and internal structure diagrams of a serial type inkjet printing apparatus 23 applied in the present embodiment. Referring to FIG. 1A, when a print command is inputted, a plurality of print media P stacked on a feed tray 12 are fed into an apparatus main body one by one, and after printing has been performed, discharged to a discharge tray 22.

Referring to FIG. 1B, a print head 1 mounted on a carriage 5 ejects inks from nozzles to form an image on a print medium P while reciprocating in an X direction along a guide rail 4. The print head 1 has a plurality of nozzle arrays respectively corresponding different colored inks and image enhancing liquid. In the present embodiment, the nozzle arrays are nozzle arrays for ejecting six colored pigment inks for cyan (C), magenta (M), yellow (Y), black (K), light cyan (LC), and light magenta (LM), and colorless and transparent image enhancing liquid (CL), respectively.

FIG. 2 is a diagram illustrating an arrangement state of the above-described nozzle arrays in the print head 1. The six nozzle arrays ejecting the six colored inks and the one nozzle array ejecting the image enhancing liquid have the same width in a Y direction, and are parallel arranged in an X direction intersecting with the Y direction. In each of the nozzle arrays, 768 nozzles for ejecting a corresponding ink as droplets are arranged in the Y direction at pitches of 1200 dpi.

Returning to FIG. 1B, driving force of a carriage motor 11, which is transmitted through a timing belt 17, causes the carriage 5 to reciprocate in the X direction along a guide shaft 3 and the guide rail 4. At this time, an encoder sensor 21 provided on the carriage 5 reads a linear scale 19 provided along the X direction to detect a position and speed of the carriage 5 in the apparatus. When the carriage 5 is moved, the print head 1 ejects ink from each of nozzles arrayed in the nozzle arrays according to a detected value of the encoder sensor 21 and inputted print data. In doing so, one print scan by the print head 1 is performed.

Regarding the print medium P in an area where printing is performed by the above print scan, an upstream part thereof is held between a conveyance roller 16 and a pinch roller 15 as well as a back side thereof being supported by a platen 2, and thereby smoothness thereof with respect to the print head 1 is kept. Also, every time one print scan as described above finishes, the conveyance roller 16 and pinch roller 15 rotate, and thereby the print medium P is conveyed in the Y direction a distance corresponding to a print width of the print head 1. Such a conveyance operation is performed by driving force of a conveyance motor 13 rotating the conveyance roller 16 through a linear wheel 20.

By alternating the print scan and conveyance operation as described above, an image is printed on the print medium P.

In a home position, ink tanks 7 for storing the inks with which the print head 1 is replenished, and a head cap 10 and recovery unit 14 for performing a maintenance process of the print head 1 are provided. When ink supply is required, the print head 1 moves to the home position, where required inks stored in corresponding ink tanks 7 are supplied to the print head 1 through supply tubes 9.

Figure 3:
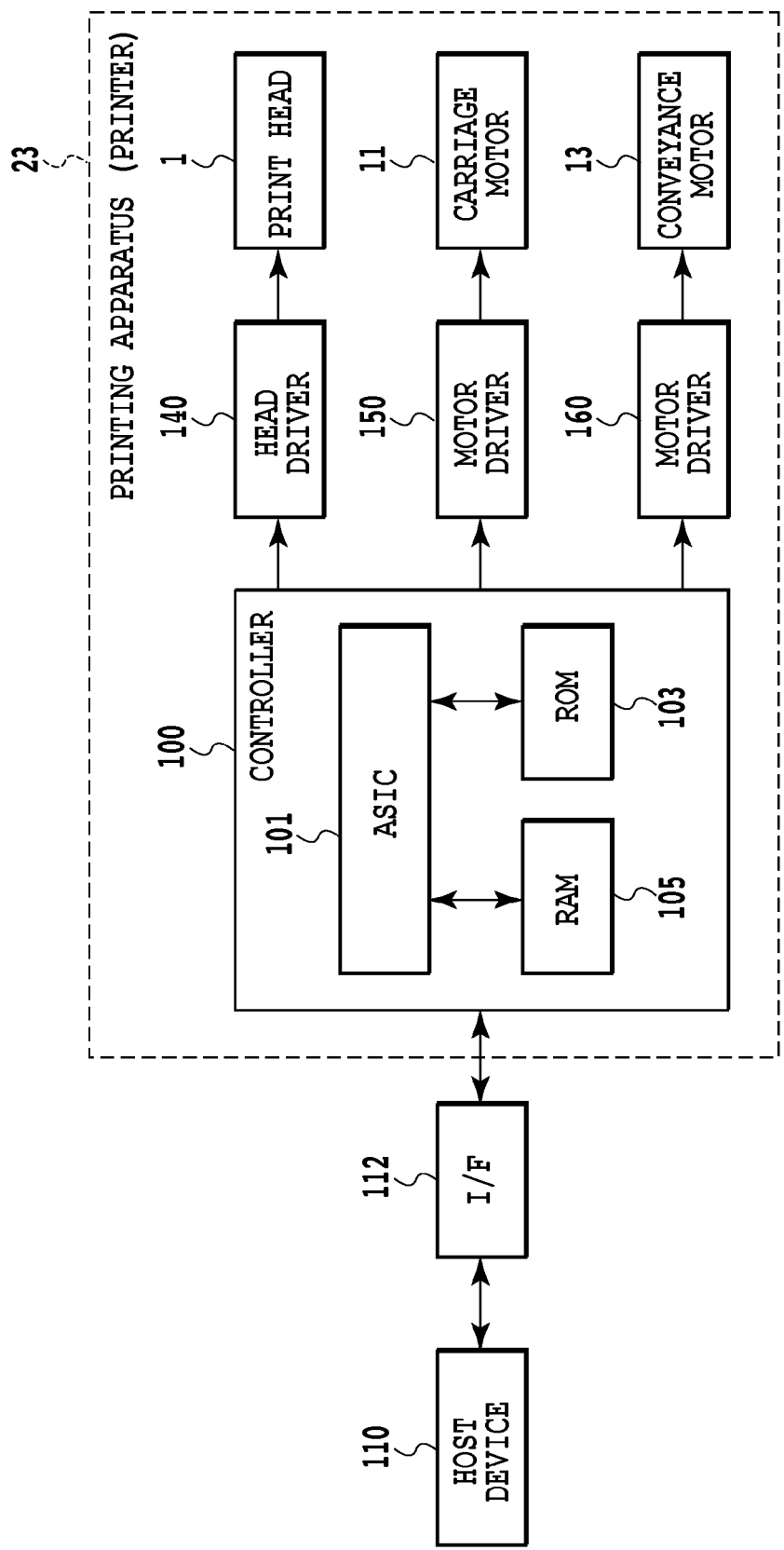
FIG. 3 is a block diagram illustrating a control configuration of the ink jet printing apparatus.

FIG. 3 is a block diagram illustrating a control configuration of the inkjet printing apparatus in the present embodiment. A controller 100 serves as a main control part, and has, for example, an ASIC 101 having a microcomputer configuration, a ROM 103, and a RAM 105. The ROM 103 stores, in addition to various types of programs executed by the ASIC 101, after-mentioned dot arrangement patterns, mask patterns, and other pieces of fixed data. In the case of executing a program, the RAM 105 is used as an area for expanding image data or a working area. In the present embodiment, according to a program read from the ROM 103, the ASIC 101 performs predetermined image processing on image data received from a host device 110, and while controlling various types of mechanisms such as the print head 1, print an image on the print medium P according to print data resulting from the processing.

The host device 110 is an after-mentioned image data supply source (in addition to serving as a computer that performs generation, processing, and the like of data on an image or the like, which are associated with printing, may have a configuration as a reader part for image reading, or the like). Image data, other commands, status signals, and the like are transmitted/received to/from the controller 100 through an interface (I/F) 112.

A head driver 140 drives the print head 1 under control of the ASIC 100 according to print data resulting from the image processing. A motor driver 150 drives the carriage motor 11, and a motor driver 160 drives the conveyance motor 13.

(Ink Configuration)

In the following, the colored inks used for the ink jet printing apparatus of the present embodiment, and the colorless and transparent image enhancing liquid used for gloss control are described. First, respective components constituting the colored inks are described.

(Aqueous Medium)

For the inks used in the present invention, an aqueous medium containing water and a water-soluble organic solvent is preferably used. A content of the water-soluble organic solvent in each of the inks (mass %) is preferably set between 3.0 mass % and 50.0 mass % inclusive with respect to a total mass of the ink. Also, a content of water in each of the inks (mass %) is preferably set between 50.0 mass % and 95.0 mass % inclusive with respect to a total mass of the ink.

Specifically, as the water-soluble organic solvent, for example, any of the following substances can be used: C1-C6 alkyl alcohols such as methanol, ethanol, propanol, propanediol, butanol, butanediol, pentanol, pentanediol, hexanol, and hexanediol; amides such as dimethylformamide and dimethylacetamide; ketones and ketoalcohols such as acetone and diacetone alcohol; ethers such as tetrahydrofuran and dioxane; polyalkylene glycols such as polyethylene glycol and polypropylene glycol with mean molecular weights of 200, 300, 400, 600, and 1000; alkylene glycols having a C2-C6 alkylene base, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerine; lower alkyl ethers of polyalcohols, such as ethylene glycol monomethyl (or ethyl)ether, diethylene glycol methyl (or ethyl)ether, or triethylene glycol monomethyl (or ethyl) ether; and N-methyl-2-pyrrolidone, 2-pyrrolidone, and 1,3-dimethyl-2-imidazolidinone. Also, as the water, deionized water (ion-exchanged water) is preferably used.

(Pigment)

As pigment, carbon black or organic pigment is preferably used. A content of the pigment in each of the inks (mass %) is preferably set between 0.1 mass % and 15.0 mass % inclusive with respect to a total mass of the ink.

For the black ink, carbon black such as furnace black, lampblack, acetylene black, or channel black is preferably used as pigment. Specifically, any of the following commercially available products and the like can be used: Raven 7000, 5750, 5250, 5000 ULTRA, 3500, 2000, 1500, 1250, 1200, 1190 ULTRA-II, 1170, and 1255 (manufactured by Columbia); Black Pearls L, Regal 330R, 400R, and 660R, Mogul L, Monarch 700, 800, 880, 900, 1000, 1100, 1300, 1400, and 2000, and Vulcan XC-72R (manufactured by Cabot); Color Black FW1, FW2, FW2V, FW18, FW200, S150, S160, and S170, Printex 35, U, V, 140U, and 140V, Special Black 6, 5, 4A, and 4 (manufactured by Degussa); and No. 25, No. 33, No. 40, No. 47, No. 52, No. 900, No. 2300, MCF-88, MA600, MA7, MA8, and MA100 (manufactured by Mitsubishi Chemical). Carbon black newly prepared for the present invention can also be used. It should be appreciated that the present invention is not limited to any of the above-described products, but can also use any of conventional carbon blacks. Also, the present invention is not limited to any of the carbon blacks, but may use a substance such as magnetite, ferrite, or other magnetic nanoparticles, or titanium black as the pigment.

Specifically, as the organic pigment, for example, any of the following substances can be used: water-insoluble azo pigments such as Toluidine Red, Toluidine Maroon, Hansa Yellow, Benzidine Yellow, and Pyrazolone Red; water-soluble azo pigments such as Lithol Red, Helio Bordeaux, Pigment Scarlet, and Permanent Red 2B; vat dye derivatives such as Alizarin, Indanthrone, and Thioindigo Maroon; phthalocyanine-based pigments such as Phthalocyanine Blue and Phthalocyanine Green; quinacridone-based pigments such as Quinacridone Red and Quinacridone Magenta; perylene-based pigments such as Perylene Red and Perylene Scarlet; isoindolinone-based pigments such as Isoindolinone Yellow and Isoindolinone Orange; imidazolone-based pigments such as Benzimidazolone Yellow, Benzimidazolone Orange, and Benzimidazolone Red; pyranthrone-based pigments such as Pyranthrone Red and Pyranthrone Orange; indigo-based pigments, condensed azo pigments, thioindigo-based pigments, and diketo-pyrrolo-pyrrole-based pigments; and Flavanthrone Yellow, Acylamido Yellow, Quinoline Yellow, Nickel Azo Yellow, Copper Azomethine Yellow, Perinone Orange, Anthrone Orange, Dianthraquinonyl Red, Dioxazine Violet, and the like. It should be appreciated that the present invention is not limited to any of the above substances.

Further, when expressing organic pigments by color index (C.I.) numbers, for example, the following substances can be used: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, 185, and so on; C.I. Pigment Orange 16, 36, 43, 51, 55, 59, 61, 71, and so on; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, and so on; C.I. Pigment Violet 19, 23, 29, 30, 37, 40, 50, and so on; C.I. Pigment Blue 15, 15:1, 15:3, 15:4, 15:6, 22, 60, 64, and so on; C.I. Pigment Green 7, 36, and so on; and C.I. Pigment Brown 23, 25, 26, and so on. It should be appreciated that the present invention is not limited to any of the above substances.

(Dispersant)

As a dispersant for dispersing pigment such as any of the above substances in the aqueous medium, any water-soluble resin can be used. In particular, a dispersant having a weight-average molecular weight between 1,000 and 30,000 inclusive is preferable, and more preferably between 3,000 and 15,000 inclusive. A content of the dispersant in each of the inks (mass %) is preferably set between 0.1 mass % and 5.0 mass % inclusive with respect to a total mass of the ink.

Specifically, as the dispersant, for example, any of the following substances can be used: styrene, vinylnaphthalene, aliphatic alcohol esters of ethylene/$\alpha,\beta$-unsaturated carboxylic acid, acrylic acid, maleic acid, itaconic acid, fumaric acid, vinyl acetate, vinyl pyrolidone, acrylamide, and polymers taking derivatives thereof as monomers. Note that one or more of the monomers constituting a polymer is preferably a hydrophilic monomer, and a block copolymer, random copolymer, graft copolymer, or any of their salts can also be used. Alternatively, natural resin such as rosin, shellac, or starch can also be used. Such resins are preferably soluble in an aqueous solution with a dissolved base, i.e., are of an alkali-soluble type.

(Surfactant)

In order to adjust surface tension of each of the inks constituting the ink set, it is preferable to use a surfactant such as an anionic surfactant, a nonionic surfactant, or an amphoteric surfactant. Specifically, any of substances such as polyoxyethylene alkyl ether, polyoxyethylene alkyl phenols, acetylenic glycol compounds, and acetylenic glycol ethylene oxide adducts can be used.

(Other Components)

In addition to the above components, each of the inks constituting the ink set may contain a moisture-retaining solid such as urea, urea derivatives, trimethylolpropane, or trimethylolethane in order to retain moisture. A content of the moisture-retaining solid in each of the inks (mass %) is preferably between 0.1 mass % and 20.0 mass % inclusive, and more preferably between 3.0 mass % and 10.0 mass % inclusive with respect to a total mass of the ink. In addition, each of the inks constituting the ink set may contain various types of additives other than the above-described components as necessary, such as a pH adjuster, anticorrosive agent, preservative, mold inhibitor, antioxidant, reduction inhibitor, and evaporation accelerator.

Next, a method for preparing each of the colored inks used in the present embodiment is specifically described. The present invention is not limited by the following embodiment unless a scope thereof is not exceeded. Note that the terms "part" and "%" in the description are based on mass unless otherwise specifically noted.

(Preparation of Pigment Dispersion Liquids 1 to 4)

In the procedure described below, pigment dispersion liquids 1 to 4 are prepared. Note that in the following description, the dispersant refers to an aqueous solution obtained by neutralizing a styrene-acrylic acid copolymer having an acid value of 200 and a weight-average molecular weight of 10,000 with a 10 mass % sodium hydroxide solution.

<Preparation of Pigment Dispersion Liquid 1 Containing C.I. Pigment Red 122>

10 parts pigment (C.I. Pigment Red 122), 20 parts dispersant, and 70 parts ion-exchanged water were mixed with one another, and dispersed for three hours with use of a batch-type vertical sand mill. After that, coarse particulate was removed by a centrifugation process. Further, the mixture was filtered under pressure through a cellulose acetate filter (manufactured by Advantec) having a pore size of 3.0 μm to obtain the pigment dispersion liquid 1 having a pigment concentration of 10 mass %.

<Preparation of Pigment Dispersion Liquid 2 Containing C.I. Pigment Blue 15:3>

10 parts pigment (C.I. Pigment Blue 15:3), 20 parts dispersant, and 70 parts ion-exchanged water were mixed with one another, and dispersed for five hours with use of a batch-type vertical sand mill. After that, coarse particulate was removed by a centrifugation process. Further, the mixture was filtered under pressure through a cellulose acetate filter (manufactured by Advantec) having a pore size of 3.0 μm to obtain the pigment dispersion liquid 2 having a pigment concentration of 10 mass %.

<Preparation of Pigment Dispersion Liquid 3 Containing C.I. Pigment Yellow 74>

10 parts pigment (C.I. Pigment Yellow 74), 20 parts dispersant, and 70 parts ion-exchanged water were mixed with one another, and dispersed for one hour with use of a batch-type vertical sand mill. After that, coarse particulate was removed by a centrifugation process. Further, the mixture was filtered under pressure through a cellulose acetate filter (manufactured by Advantec) having a pore size of 3.0 μm to obtain the pigment dispersion liquid 3 having a pigment concentration of 10 mass %.

<Preparation of Pigment Dispersion Liquid 4 Containing C.I. Pigment Black 7>

10 parts carbon black pigment (C.I. Pigment Black 7), 20 parts dispersant, and 70 parts ion-exchanged water were mixed with one another, and dispersed for three hours with use of a batch-type vertical sand mill. Note that a circumferential speed at the time of the dispersion was set twice that at the time of the preparation of the pigment dispersion liquid 1. After that, coarse particulate was removed by a centrifugation process. Further, the mixture was filtered under pressure through a cellulose acetate filter (manufactured by Advantec) having a pore size of 3.0 μm to obtain the pigment dispersion liquid 4 having a pigment concentration of 10 mass %.

(Ink Preparation)

FIG. 4 is a diagram illustrating component distributions for preparing the six types of colored inks used in the present embodiment. For the preparation, after mixing and sufficiently stirring the above-described pigment dispersion liquids 1 to 4 and respective components listed in the diagram, the mixtures were filtered under pressure through a cellulose acetate filter (manufactured by Advantec) having a pore size of 0.8 μm to prepare the inks 1 to 6.

Next, the image enhancing liquid for controlling gloss, which is used in the present embodiment, is described. The image enhancing liquid in the present embodiment is assumed to be colorless and transparent.

(Preparation of Image Enhancing Liquid)

A styrene (St)—acrylic acid (AA) copolymer (A) (St/AA=70/30 (mass %), molecular weight: 10500, and measured acid value: 203) synthesized by a solution polymerization method using a radical initiator was used to prepare a liquid composition A having the following composition. In addition, as basic substance, potassium hydroxide was used, and an additive amount thereof was adjusted to make pH of the liquid composition equal to 8.0.

| Styrene-acrylic acid copolymer A | 2 parts |
|---|---|
| Glycerin | 7 parts |
| Diethylene glycol | 5 parts |
| Water | 86 parts |

The image enhancing liquid obtained by the above preparation is clear liquid for controlling gloss. As long as the same effect can be obtained, the image enhancing liquid is not limited to the above example.

(Characteristic Matters)

In the following, the above-described printing apparatus is used to specifically describe a characteristic configuration of the present embodiment. Note that, in this specification, as reference indicating a degree of gloss properties that are visually perceived, "glossiness" and "image clarity" are used. Here, a method for evaluating the glossiness and the image clarity is first described.

Figures 5A, 5B, 5C, 5D:
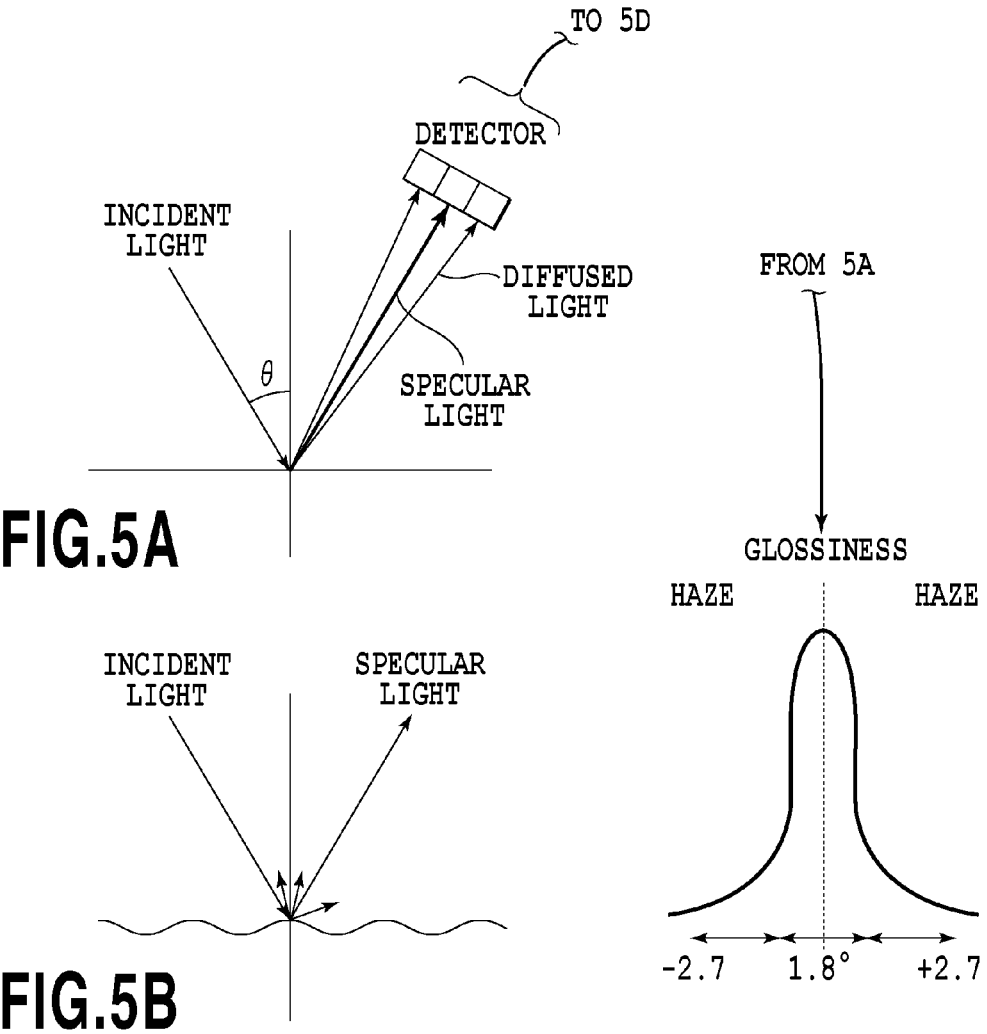
FIGS. 5A to 5D are diagrams explaining a method for measuring glossiness and image clarity.

FIGS. 5A to 5D are diagrams explaining a method for measuring the glossiness and the image clarity. Referring to FIG. 5A, in the case of 20° mirror surface glossiness (hereinafter described as glossiness), reflected light of light incident on a printed material surface at an incident angle $\theta=20°$ is detected. As a detector, for example, B-4632 manufactured by BYK-Gardner (Japanese product name Micro-Haze Plus) or the like can be employed. As illustrated in FIG. 5A, a detection part detects light intensity over a range having an aperture width of 1.8° centered around an axis of specular light, and as a result, an intensity distribution having a peak at a specular angle as illustrated in FIG. 5D is obtained. In this case, intensity of the specular light with respect to intensity of the incident light is the glossiness, and a unit of the glossiness is dimensionless. Such a glossiness measuring method is in conformity with K5600 of the JIS standards.

The image clarity represents sharpness of an image seen on an object, and it is measured with use of, for example, JIS H8686 (Test Methods for Image Clarity of Anodic Oxide Coatings on Aluminum and Aluminum Alloys) or JIS K7105 (Testing Methods for Optical Properties of Plastics). As a device for measuring the image clarity in conformity with the JIS standards, Image Clarity Meter ICM-1T (manufactured by Suga Test Instruments) or Image Clarity Measuring Device GP-1S (manufactured by Optec) is commercially available.

In the case where a degree of unevenness on a surface of a print medium serving as the object is small, as illustrated in FIG. 5B, an amount of light diffused at the surface of the print medium is small, and as compared with the diffused light, specular light is dominant. That is, light reflected on the surface is likely to become parallel, so that a relatively sharp image is seen, and therefore a value of the image clarity is high. On the other hand, as illustrated in FIG. 5C, in the case where a degree of unevenness on a surface of a print medium is large, reflected light is diffused in various directions, and therefore specular light is weakened. That is, the light reflected on the surface travels in the various directions, so that a blurred image is seen, and therefore a value of the image clarity is small.

As described above, the glossiness and the image clarity depend on surface roughness of a print medium. However, regarding a printed material, it is not that as glossiness and image clarity are increased, it is more preferable, but there is a range where an observation is easily made. As a result of examination by the present inventors, it was determined that such a range for glossiness was 30 to 60 in the case of the 20° mirror surface glossiness. Accordingly, in the present invention, regardless of a printed image, print control is performed to make glossiness of a printed material fall within the range of 30 to 60. More specifically, depending on the type of ink used, and a print density (gradation) of the ink, the glossiness and image clarity are changed, and therefor by adjusting a print amount and print timing of the image enhancing liquid depending on an image, glossiness of the whole of an image is unified within the above range. In the following, a specific control method is described.

Figure 6A:
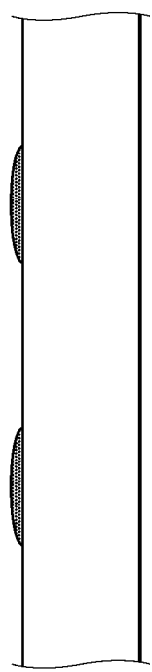
FIGS. 6A to 6F are state diagrams in which pigment ink and/or image enhancing liquid are printed on a print medium.
Figure 6B:
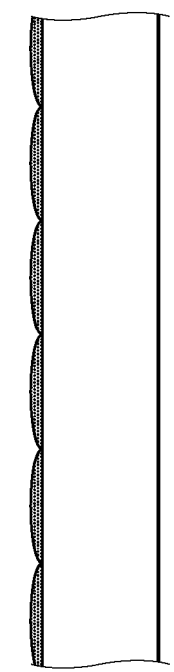
Figure 6C:
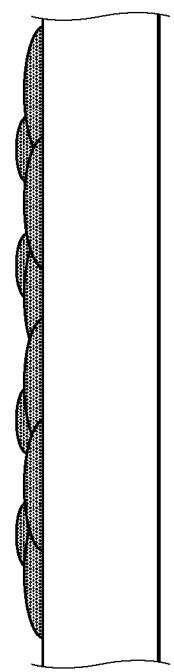
Figure 6D:
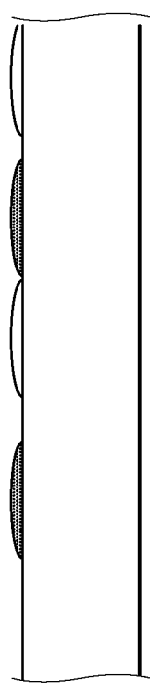

FIGS. 6A to 6F are diagrams that, on a density area basis, explain states of printing pigment ink and/or the image enhancing liquid on a print medium. As in a highlight part, in the case where a dot print density is low, printed dots are sparse as illustrated in FIG. 6A, and gloss properties of a printed surface depend on gloss properties of the print medium itself. In general, glossiness of a blank part of paper tends to be lower than that in an area where pigment ink is printed. Accordingly, glossiness of the highlight part is likely to be perceived to be lower than glossiness of an intermediate or high density area where more dots are printed. Therefore, in the present embodiment, in order to increase the glossiness of the highlight part to approximately 30 to 60, as illustrated in FIG. 6D, in some of areas where the pigment ink is not printed, the image enhancing liquid is printed.

Figure 6E:
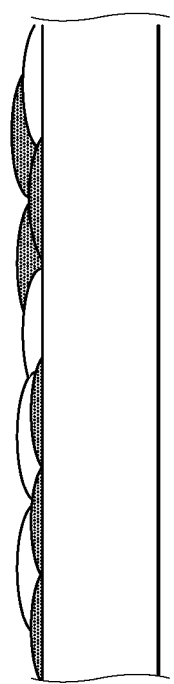

On the other hand, as in the intermediate area, at a gradation where more dots are printed, a surface of the print medium is, as illustrated in FIG. 6B, substantially covered with the pigment ink that is spread. In this case, a printed surface is smooth, and glossiness of the surface is made higher than the preferred range of 30 to 60, such as exceeding 100. For this reason, in the present embodiment, in order to dare to disturb the smoothness of the printed surface, an appropriate amount of image enhancing liquid is printed. However, the print medium has an upper limit of liquid amount that the print medium can absorb, and therefore even in the case of printing the image enhancing liquid up to the upper limit on the already formed smooth layer, the too high glossiness cannot be sufficiently reduced. Accordingly, in the present embodiment, by performing printing at substantially the same timing with mixing the pigment ink and the image enhancing liquid with each other, unevenness is formed on a printed surface to suppress the too high glossiness as illustrated in FIG. 6E.

As in the high density area, in the case of printing many more dots with overlapping one another, amounts of solids such as a color material of the pigment ink and the dispersed resin are increased, and therefore as illustrated in FIG. 6C, a lot of unevenness is formed throughout. In particular, in the case where a plurality of different pigment inks are overlapped, such unevenness becomes more noticeable. Accordingly, the glossiness of the high density area tends to be lower than that of the intermediate density area. However, according to the examination by the present inventors, the glossiness of the high density area is in the range of 60 to 80, which exceeds the preferred range of 30 to 60. Accordingly, even in the high density area, in order to decrease the glossiness, a certain amount of image enhancing liquid should be applied.

Figure 6F:
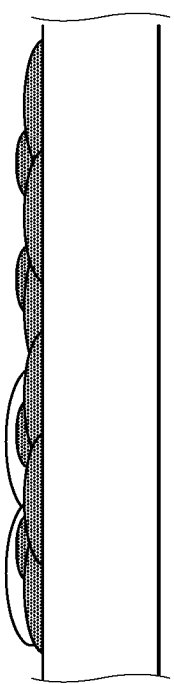

However, in the high density area, as can be seen in FIG. 6C, a lot of unevenness has already been formed, and therefore if the image enhancing liquid is applied in the same manner as that for the intermediate area, image clarity may be further reduced. Accordingly, in the present embodiment, as illustrated in FIG. 6F, the pigment ink having been already printed is overcoated with the image enhancing liquid. In doing so, the glossiness can be kept within the preferred range with the image clarity being kept.

As described above, in the present embodiment, an appropriate amount of image enhancing liquid is applied at appropriate timing on a density area basis. For this purpose, in the present embodiment, distinctive image processing as described below is performed.

Figure 7:
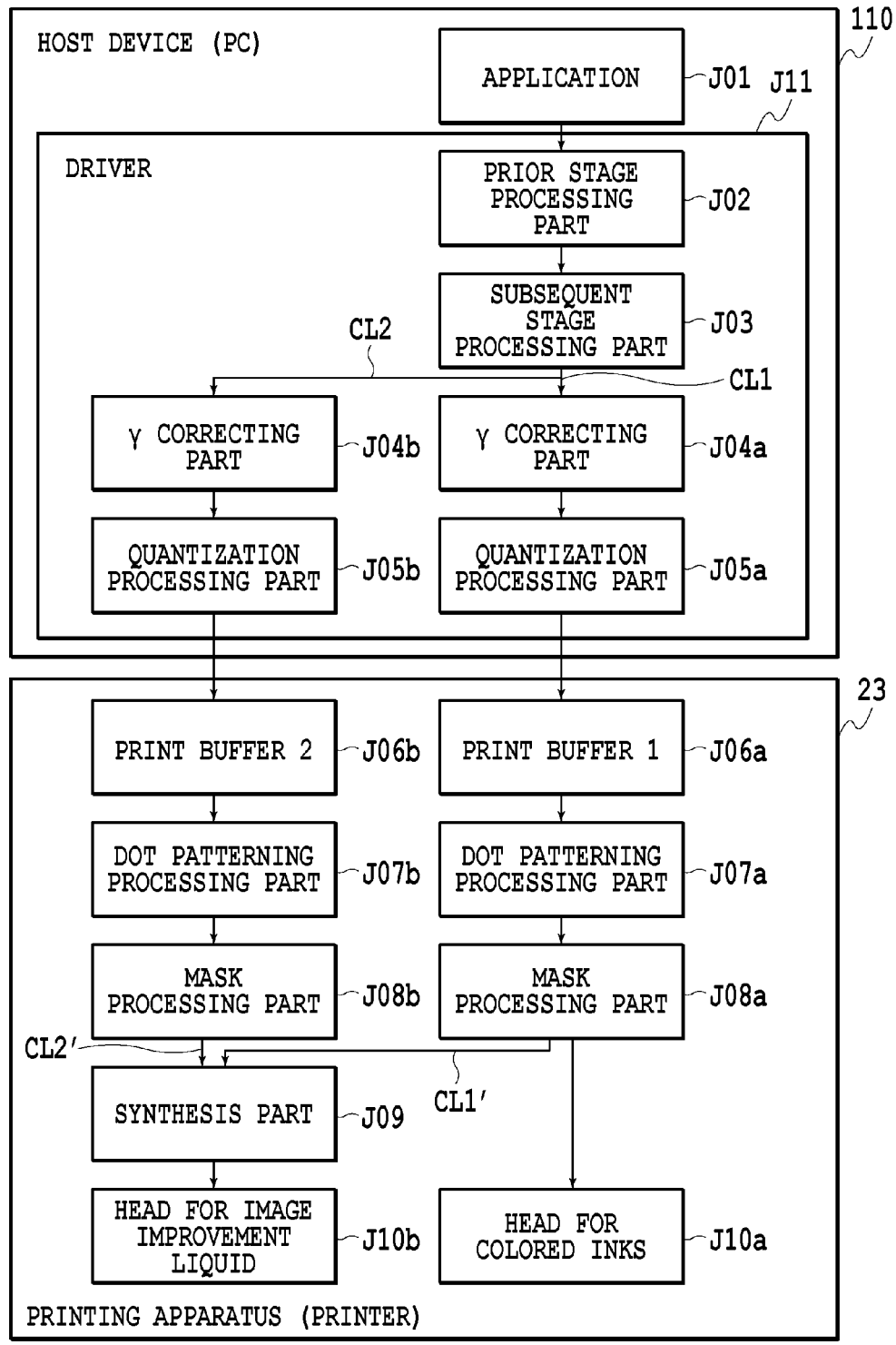
FIG. 7 is a block diagram for explaining steps of image processing.

FIG. 7 is a block diagram for explaining steps of the image processing that is performed in the host device 110 and ink jet printing apparatus 23. The host device 110 is, for example, a personal computer (PC), and includes an application J01 and a printer driver J11. On the basis of information designated by a user on an UI screen in a monitor of the host device 110, the application J01 performs a process of generating image data to be passed to the printer driver J11, and a process of setting print control information that manages the print control. The image data information and print control information to be provided to the printer driver J11 by the application J01 are configured to include "print medium information", "image information", "print quality information", and "other pieces of control information" such as a paper feeding method information. The print medium information indicates the type of a print medium to be printed, and from among plain paper, glossy paper, postcard, printable disk, and the like, any one type of print medium is designated. The "image information" refers to information indicating a feature of an image, such as a "color mode" or a "monochrome mode". In the print quality information, print quality is designated, and from among "Fine", "Normal", "Fast", and the like, any one type of quality is designated.

The printer driver J11 has, as processing steps thereof, a prior stage process J02, a subsequent stage process J03, γ correction J04 (J04a and J04b), and quantization J05 (J05a and J05b). In the following, the respective processing steps are briefly described.

A prior stage processing part J02 maps the gamut. This processing step performs data conversion for mapping the gamut reproduced by sRGB standard-based input image data (R, G, B) into the gamut reproducible by the ink jet printing apparatus of the present embodiment. Specifically, 256-gradation data represented by 8 bits for each of R, G, and B is converted to pieces of R, G, and B data (RGB values) each having 8 bits for the different gamut by using a three-dimensional LUT (lookup table).

A subsequent stage processing part J03 converts, on the basis of a three-dimensional LUT for the subsequent stage process, the pieces of R, G, and B data resulting from the above mapping to the gamut to pieces of multivalued color data (8-bit 256-gradation data for each of the colors) indicating a combination of colored inks reproducing a color represented by the piece of R, G, and B data and the image enhancing liquid. In the present embodiment, on the basis of the pieces of R, G, and B data, in addition to six pieces of multivalued data respectively corresponding to the six types of colored inks C, M, Y, K, LC and LM, first multivalued data CL1 and second multivalued data CL2 that correspond to the image enhancing liquid are generated. The first multivalued data CL1 is multivalued data for the image enhancing liquid that is, as described with FIG. 6E, printed at substantially the timing as the colored inks. Also, the second multivalued data CL2 is multivalued data for the image enhancing liquid that is, as described with FIG. 6F, printed after printing the colored inks. Then, the six pieces of multivalued data for the colored inks, and the first multivalued data for the image enhancing liquid are transmitted to a γ correcting part J04a, and the second multivalued data CL2 for the image enhancing liquid is transmitted to a γ correcting part J04b.

Figure 8:
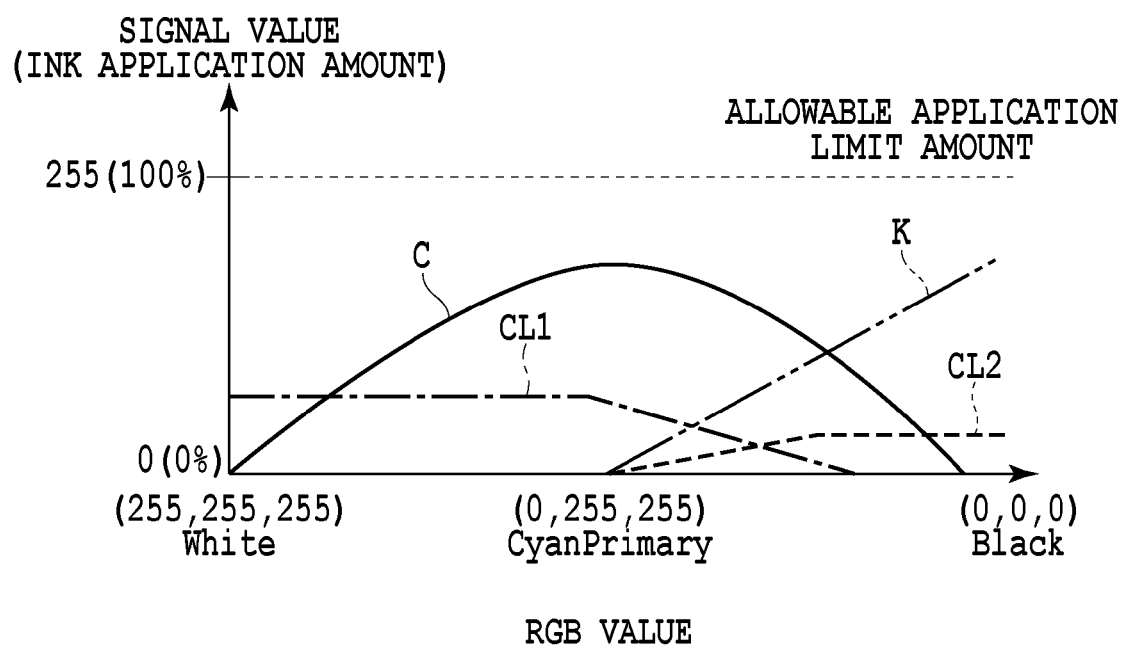
FIG. 8 is a diagram explaining an example of signal value conversion that is performed in a subsequent stage processing part.

FIG. 8 is a diagram explaining an example of signal value conversion that is performed in the subsequent stage processing part J03 of the present embodiment. The horizontal axis represents an input signal value on a cyan line from white of which (R, G, B)=(255, 255, 255) to black of which (R, G, B)=(0, 0, 0) through cyan of which (R, G, B)=(0, 255, 255). The vertical axis represents an output signal value of each of C (cyan), K (black), CL1 (first multivalued data for image enhancing liquid), and CL2 (second multivalued data for image enhancing liquid) corresponding to each individual input signal value.

On the cyan line, the output signal C for the cyan ink gradually increases from zero to have a peak at the cyan primary (0, 255, 255), and then gradually decreases toward the black to reach zero at the black. On the other hand, the output signal K for the black ink keeps at zero up to the cyan primary (0, 255, 255), and from around a point passing through the cyan primary, gradually increases to reach MAX at the black. As described above, the output signal value of each of the cyan C and the black K, a sum of the cyan C and the black K, and a ratio between the cyan and the black K change depending on an input signal value. Also, the output signal values are correlated to ink application amounts per unit area, and therefore glossiness and image clarity of a printed surface expressed by the colored inks also change depending on an input signal value.

Therefore, in the present embodiment, the first multivalued data CL1 for the image enhancing liquid that is printed at the same timing as the colored inks, and the second multivalued data CL2 for the image enhancing liquid that is printed after printing the colored inks are adjusted depending on output values of colored ink signals to control glossiness and image clarity as described with FIGS. 6A-6F. For this purpose, referring to FIG. 8, in the present embodiment, from highlight to intermediate density cyan, where a dot print density is relatively low, CL1 (first multivalued data) is mainly used. Also, from the cyan to the black, where the dot print density is relatively high, CL1 is gradually decreased to finally zero, and along with the decrease, CL2 (second multivalued data) is gradually increased. That is, from the highlight to the cyan, the image enhancing liquid is applied at the same timing as the cyan ink to obtain the print state as illustrated in FIG. 6B or 6D. On the other hand, in an area close to the black, after printing the cyan ink and the black ink, the image enhancing liquid is applied to obtain the print state as illustrated in FIG. 6F. In either case, glossiness and image clarity within the preferred ranges can be obtained to suppress gloss unevenness.

Note that, in the above case, timing (in signal value) at which CL1 (first multivalued data) starts to decrease and timing at which K becomes larger than zero are made nearly equal to each other; however, the present embodiment is not limited to such signal value conversion. Even in an area closer to the highlight, where K is zero, in the case where a paper surface is covered with ink, depending on glossiness and image clarity, a signal value for CL1 may be decreased whereas CL2 may be made larger than zero.

In the above, the cyan line is taken as an example to provide the description with FIG. 8; however, such adjustment can be made appropriate at all gradations for all of the colored inks. In this case, it is only necessary that appropriate CL1 and CL2 are related to the pieces of multivalued data (C, M, Y, K, LC, LM) converted from the individual input signal values (R, G, B) in the three-dimensional LUT referred to by the subsequent stage processing part J03. In addition, in both of the prior stage process and the subsequent stage process, data not adapted to any grid point of the tables may be converted using an interpolation operation.

The γ correcting parts J04a and J04b perform density value (gradation value) conversion on the multivalued data on each of the colors. Specifically, a one-dimensional LUT is used to convert the 8-bit multivalued color data to 12-bit multivalued data (4096 values) so as to enable linear mapping to gradation characteristics of the printer.

Quantization parts J05a and J05b perform a pseudo halftone process (halftoning process) such as error diffusion on the γ-corrected 12-bit multivalued color data on each of the colors to convert the data to data with N values that are less than the 4096 values. Specifically, multivalued half toning is performed with N=approximately 3 to 16 values and 2 to 4 bits for each of the colors. In the present embodiment, the case of conversion to 4-bit 5-value data is taken as an example to continue the following description. Note that the present invention does not necessarily require the process of performing the quantization into multiple values, but may be configured to, in this stage, perform a binary quantization process.

Note that the above-described image processing in the prior stage processing part J02 to the quantization processing parts J05 is performed entirely at resolution of 600 ppi (pixels per inch). This corresponds to half the resolution (1200 dpi) at which the print head 1 prints dots. The pieces of 5-value data generated by the quantization processing parts J05a and J05b are outputted to the printing apparatus 210 together with the above-described print control information.

Each of the pieces of 5-value data that have been subjected to the quantization process and received from the host device 110 is stored in a print buffer 1 J06a or a print buffer 2 J06b on an ink type basis.

Dot arrangement patterning processing parts J07a and J07b convert the pieces of inputted 600 dpi 5-value data to 1200 dpi dot arrangement patterns that are represented by 2 values of dot print and dot non-print.

Figure 9:
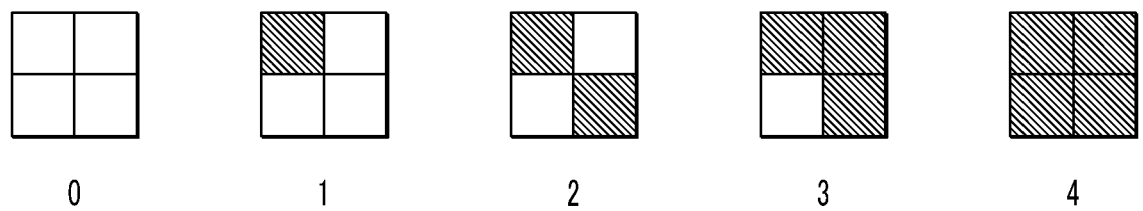
FIG. 9 is a diagram illustrating an example of a dot arrangement pattern.

FIG. 9 is a diagram illustrating an example of the dot arrangement pattern. In the present embodiment, each of the pieces of inputted 5-value data is any of 0 to 4, and therefore the dot arrangement patterning processing part J07a or J07b selects, from among preliminarily stored dot patterns as illustrated in FIG. 9, one dot arrangement pattern corresponding to a level value. In the dot arrangement pattern, each square represents one pixel area having the resolution of 1200 dpi, and an area shaded by black represents a pixel printed with a dot, whereas a white area represent a pixel not printed with a dot. Such dot patterning processing parts J07a and J07b convert the pieces of multivalued color data, the first multivalued data, and the second multivalued data to the pieces of binary color data, the first binary data, and the second binary data, respectively.

In subsequent mask processing parts J08a and J08b, mask patterns having a mutually complementary relationship are used to determine scans during which printing is actually performed on each of pixels that the dot arrangement patterning processing parts J07a and J07b determine to print.

Figure 10A:
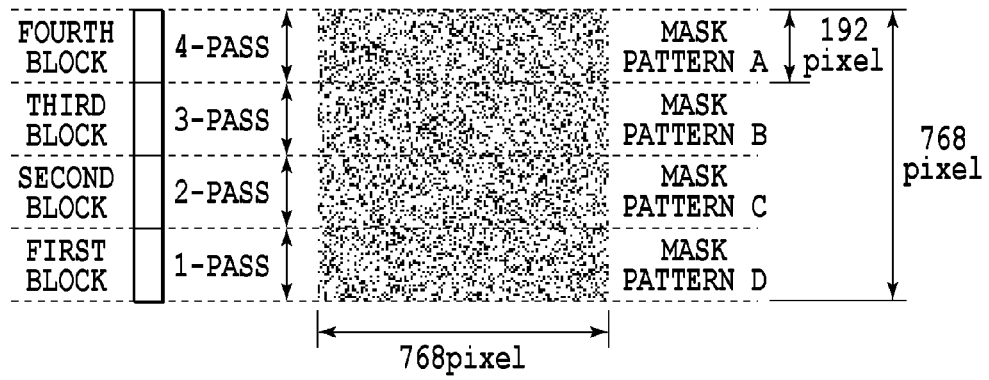
FIGS. 10A and 10B are diagrams for explaining a typical multipass printing method.
Figure 10B:
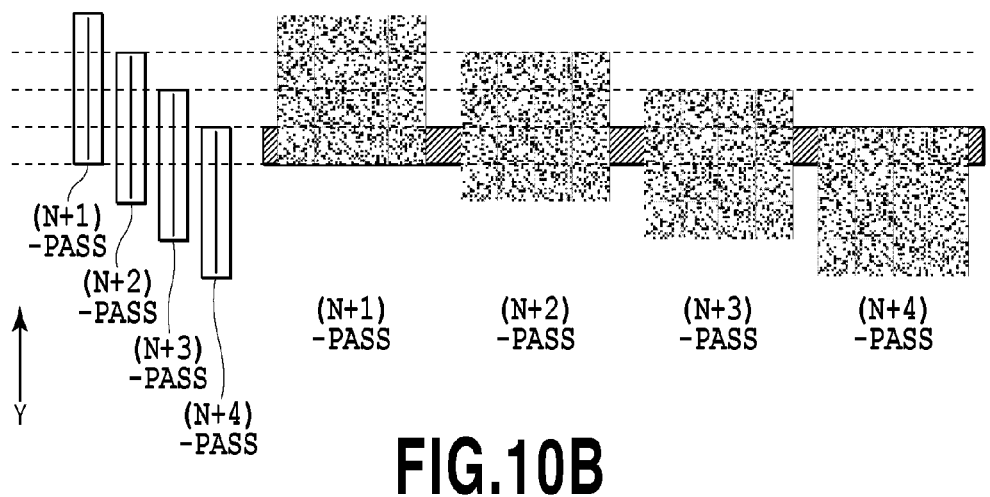

FIGS. 10A and 10B are diagrams for explaining a typical multipass printing method. In multipass printing, an area that is printable by one print scan of a print head is printed by a plurality of print scans by dividing print data into a plurality of print scans. Here, the case of performing 4-pass multipass printing is taken as an example to provide a description. In the case of the 4-pass multipass printing, 768 nozzles included in each of the nozzle arrays are divided into 4 blocks each having 192 nozzles, and the respective blocks are assigned with different mask patterns A to D. In these mask patterns, an area shaded by black represents a print allowable pixel where dot printing is allowed, whereas a white area represents a print nonallowable pixel where dot printing is not allowed, and the mask patterns A to D have a mutually exclusive and complementary relationship. The diagram illustrates the case where ratios in the print allowable pixels of the respective mask patterns A to D are equally 25%.

FIG. 10B is a diagram explaining states of using the mask patterns illustrated in FIG. 10A to perform the 4-pass multipass printing. In the case of the 4-pass multipass printing, every time a print scan is performed once, a print medium is conveyed in the Y direction a distance corresponding to one block, i.e., 192 pixels. In doing so, in an image area of the print medium, which corresponds to a width of one block, a 100% image is adapted to be completed by four print scans.

In each of the mask processing parts J08a and J08b in FIG. 7, between the mask patterns prepared as described and the pieces of binary data outputted from the dot patterning processing part J07a or J07b, AND operations are performed to determine pixels to be printed with dots by each print scan.

Meanwhile, in the above-described multipass printing, by characterizing mask patterns to be prepared, various types of print control can be performed. Therefore, in the present embodiment, in order to make timing to print CL1 and timing to print CL2 different from each other, the mask processing parts J08a and J08b uses distinctive mask patterns described below.

Figure 11A:
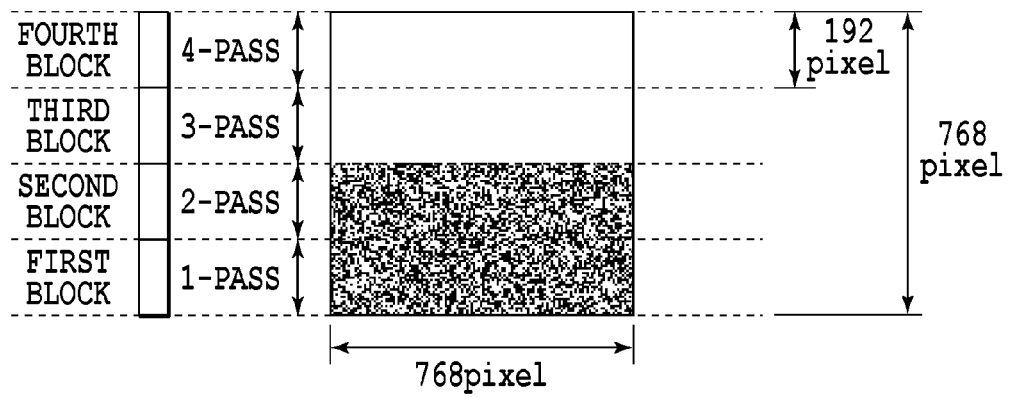
FIGS. 11A and 11B are diagrams illustrating mask patterns in a first embodiment.
Figure 11B:
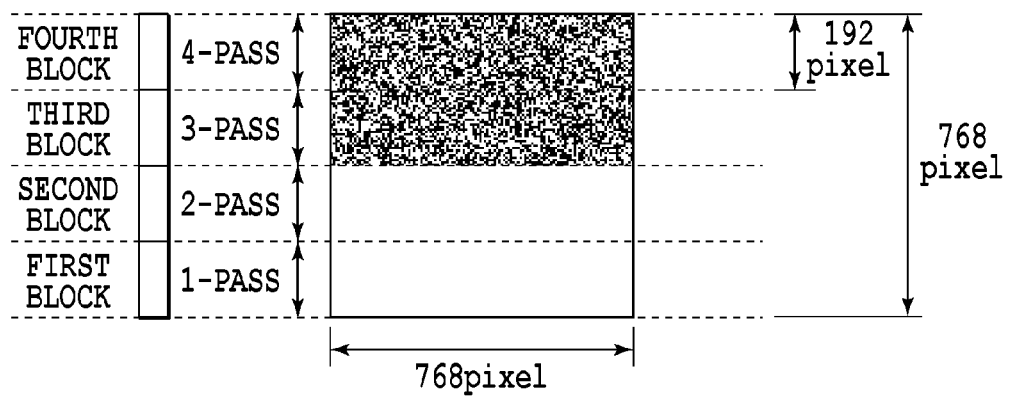

FIGS. 11A and 11B are diagrams illustrating the mask patterns used in the mask processing parts J08a and J08b, respectively. FIG. 11A illustrates the mask pattern that is used in the mask processing part J08a and intended for the six colored inks and CL1. A first block and a second block are assigned with mask patterns that have a mutually complementary relationship and print allowable rates of 50%, respectively, whereas print allowable rates of a third block and a fourth block are 0%. On the other hand, FIG. 11B illustrates the mask pattern that is used in the mask processing part J08b and intended for CL2. Print allowable rates of a first block and a second block are 0%, whereas a third block and a fourth block are assigned with mask patterns that have a mutually complementary relationship and print allowable rates of 50%, respectively.

Figure 12A:
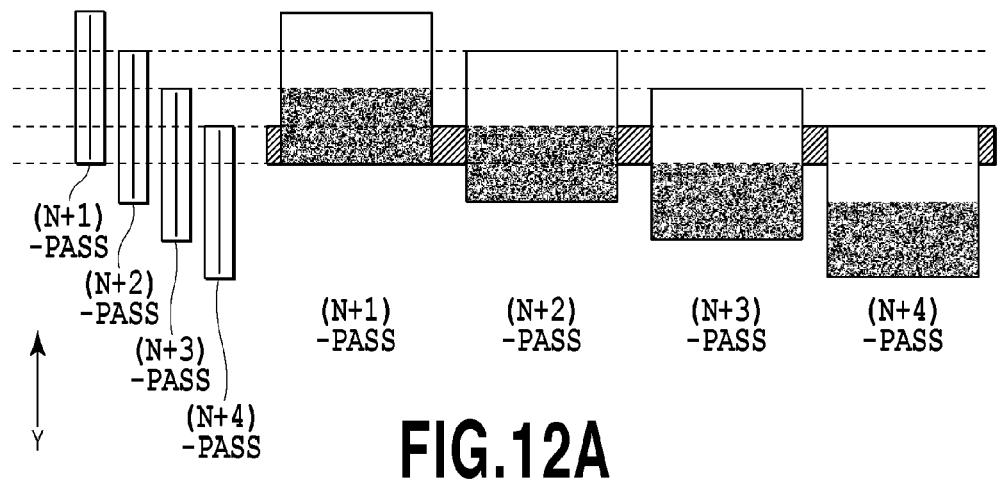
FIGS. 12A and 12B are diagrams illustrating print states in the case of using the mask patterns.
Figure 12B:
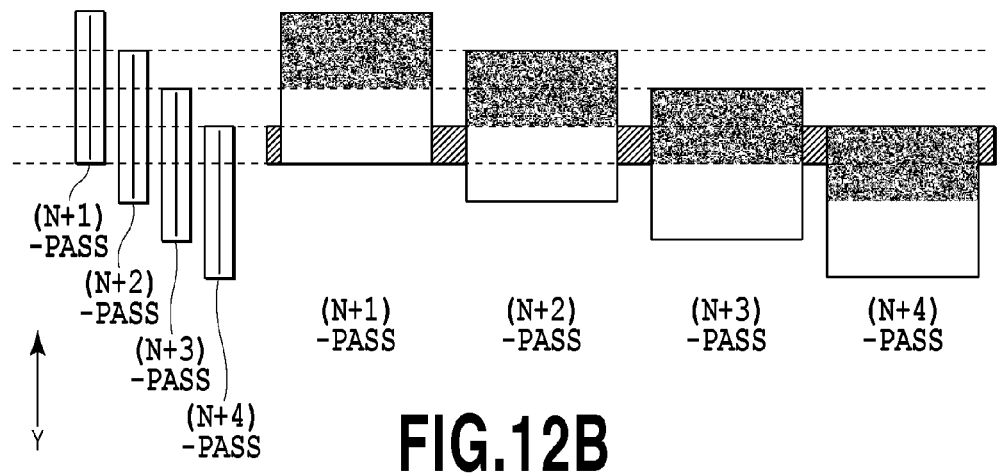

FIGS. 12A and 12B are diagrams illustrating respective print states in the case of using the mask patterns illustrated in FIGS. 11A and 11B to perform the 4-pass multipass printing. The same image area of a print medium, which corresponds to one block, has been printed through the mask pattern illustrated in FIG. 11A during the first and second passes, and subsequently, printed through the mask pattern illustrated in FIG. 11B during the third and fourth passes. That is, during the first and second passes, the colored inks and the CL1 data for the image enhancing liquid have been printed, and during the subsequent third and fourth passes, the CL2 data for the image enhancing liquid is printed.

Among the pieces of print data generated in the mask processing part J08a, the pieces of binary data for the colored inks are sent to the nozzle arrays J10a for the colored inks, and the print data for the image enhancing liquid is sent to a synthesis part J09a. In the synthesis part J09a, the binary data for the image enhancing liquid, which is outputted from the mask processing part J08a, i.e., the binary data CL1' converted from CL1, and binary data for the image enhancing liquid, which is outputted from the mask processing part J08b, i.e., the binary data CL2' converted from CL2 are synthesized.

In doing so, the mask pattern used in the mask processing part J08a and the mask pattern used in the mask processing part J08b have the completely exclusive relationship as illustrated in FIGS. 11A and 11B. Therefore, the pieces of binary data CL1' and CL2' having been processed with use of such mask patterns have also a mutually exclusive relationship, and pixel positions where print is "1" never overlap with each other. Accordingly, the synthesis part J09 performs an OR operation of the two pieces of binary data CL1' and CL2', and can thereby generate binary print data for the nozzle array for the image enhancing liquid. The result of the generation is transmitted to the nozzle array J10b for the image enhancing liquid.

Figure 13:
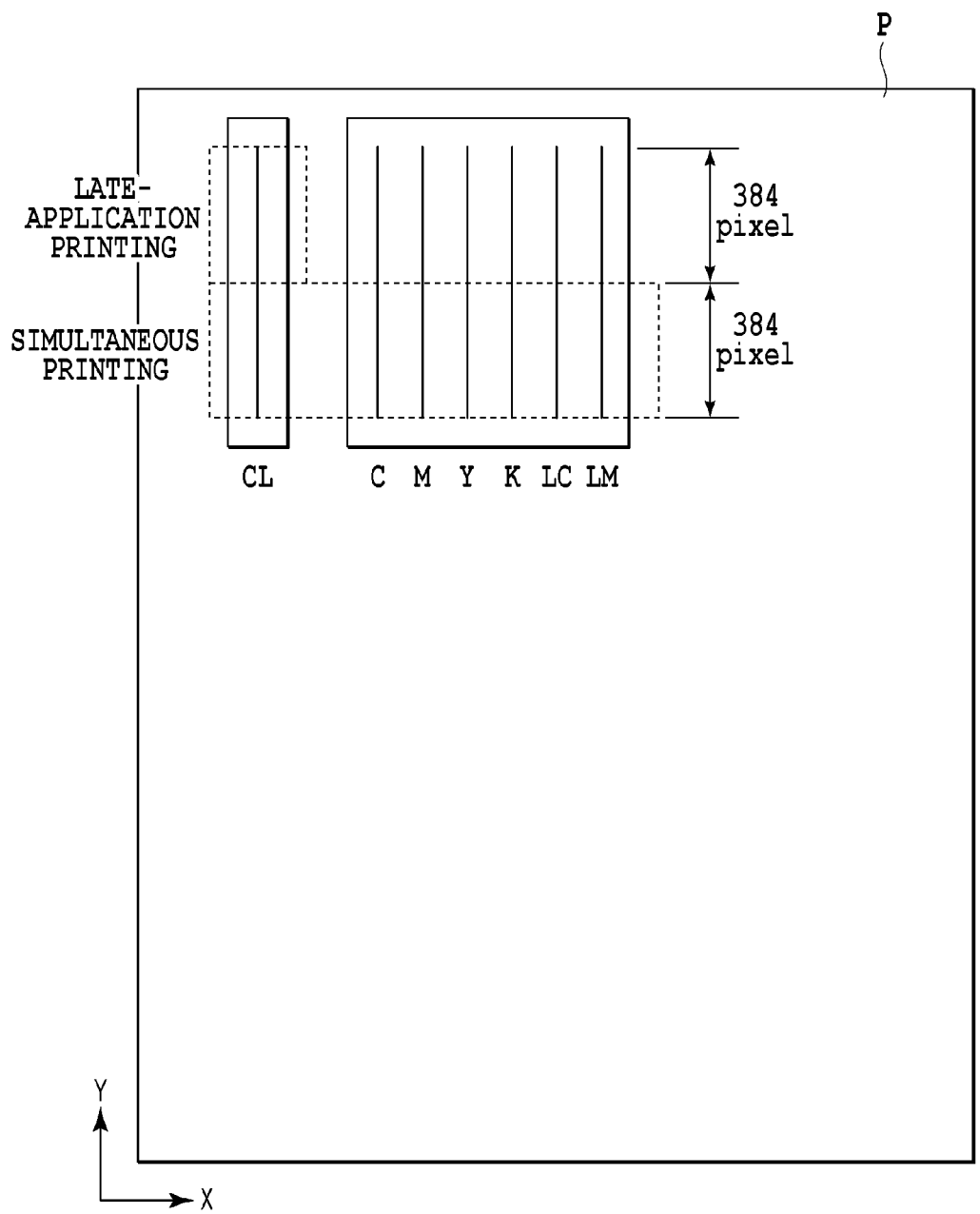
FIG. 13 is a diagram explaining nozzle areas actually used for printing in the first embodiment.

FIG. 13 is a diagram explaining nozzle areas actually used for printing in the respective nozzle arrays as a result of the image processing described above. The nozzle arrays that respectively eject the colored inks use the mask pattern illustrated in FIG. 11B, and therefore each nozzle area where an ejection operation is actually performed corresponds to lower half two blocks (384 nozzles). On the other hand, the nozzle array for the image enhancing liquid uses a logical addition of both of the mask patterns illustrated in FIGS. 11A and 11B, and therefore the entire nozzle area (768 nozzles) is used to perform an ejection operation. At this time, in a lower half area, an ejection operation based on the binary data CL1' converted from the first multivalued data CL1 is performed, and the image enhancing liquid is applied on a print medium at the same timing as that for the colored inks. On the other hand, in an upper half area, an ejection operation based on the binary data CL2' converted from the second multivalued data CL2 is performed to apply the image enhancing liquid on a layer of the already printed colored inks and image enhancing liquid.

Figure 14A:
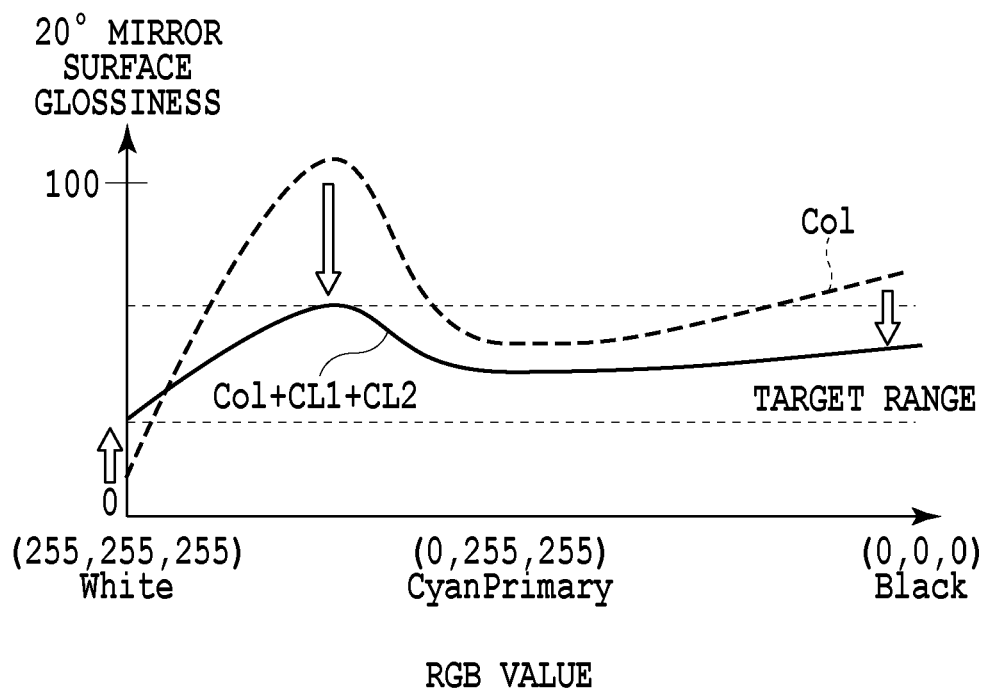
FIGS. 14A and 14B are diagrams explaining glossiness and image clarity in the first embodiment.
Figure 14B:
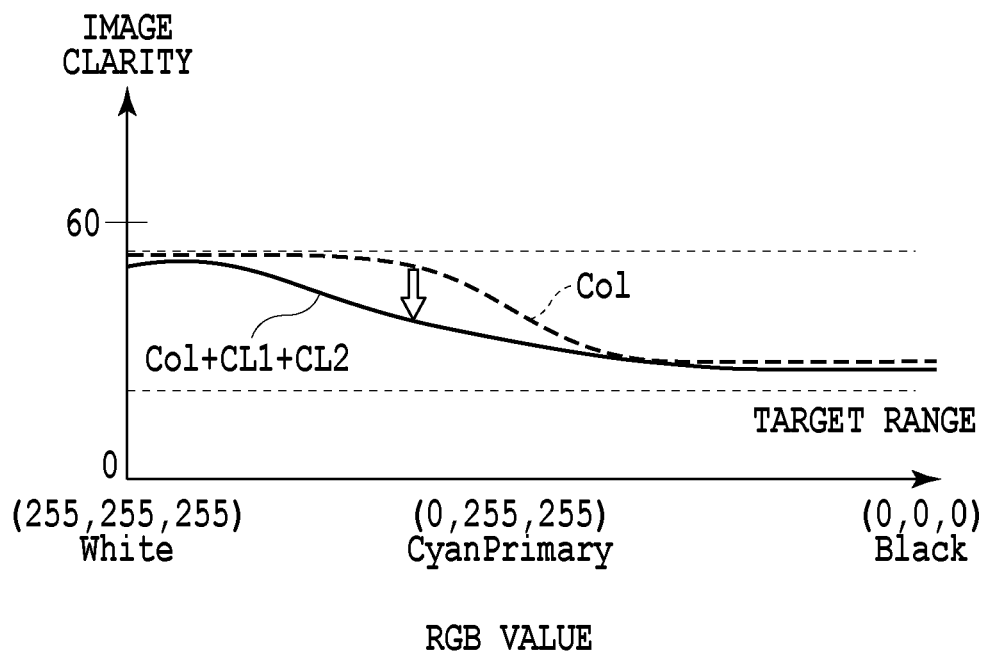

FIGS. 14A and 14B are diagrams for explaining glossiness and image clarity in the case of performing the signal value conversion and print operation of the present embodiment. In the respective diagrams, the horizontal axes represent the same cyan line signal values as in FIG. 8. Also, dashed lines represent glossiness and image clarity in the case of printing without using the image enhancing liquid, and solid lines represent glossiness and image clarity in the case of printing the image enhancing liquid in the above-described manner.

In the case of using only the colored inks, in a highlight part from white, the image clarity is within the target range; however, the glossiness falls below the target range. This is because, as described with FIG. 6A, printed dots are sparse, and therefore gloss properties of a printed surface depend on gloss properties of a print medium itself. On the other hand, in the case of printing the image enhancing liquid in the manner of the present embodiment, as illustrated in FIG. 6D, some of blank areas of paper are printed with the image enhancing liquid, and therefore the glossiness increases to within the target range. Further, the image clarity also keeps within the target range.

In an intermediate density area, in the case of printing only the colored inks, the image clarity is within the target range, whereas the glossiness largely exceeds the target range. This is because, as described with FIG. 6B, a surface of the print medium is substantially covered with the spread pigment inks, and high glossiness of the pigment inks themselves appears. On the other hand, in the case of using the image enhancing liquid in the manner of the present embodiment, appropriate unevenness is formed as illustrated in FIG. 6E, and therefore the glossiness falls within the target range. Also, the image clarity keeps within the target range although a value thereof decreases.

In a high density area, in the case of using only the colored inks, the image clarity is within the target range, but rather low as compared with that in the highlight part or intermediate density area. This is because, as described with FIG. 6C, amounts of solids such as a color material of each of the pigment inks and the dispersed resin are increased, and therefore a lot of unevenness is formed throughout. Further, the glossiness exceeds the target range. On the other hand, in the present embodiment, as illustrated in FIG. 6F, the layer of the pigment inks is overcoated with the image enhancing liquid. Accordingly, without forming unevenness more than necessary to further reduce the image clarity, the glossiness is decreased to within the target range.

FIG. 15 is a diagram illustrating the effects explained with FIGS. 14A and 14B with relating the effects to the print states in FIGS. 6A to 6F. In the print states A to C where printing is performed only with the pigment ink, glossiness varies depending on a density area, whereas as in the present embodiment, in the print states D to F where the image enhancing liquid is additionally printed, all density areas equally have middle range glossiness (30 to 60). On the other hand, image clarity is kept within the target range (middle range). As described, according to the present embodiment, a variation in gloss properties among density areas, taking into account both of image clarity and glossiness, can be suppressed to avoid gloss unevenness.

Note that the generation of CL1 or CL2 in the subsequent stage processing part J03 as described with FIG. 8 is not limited to that performed with respect to the cyan line, but can be performed in the whole of RGB space. That is, according to the present embodiment, at all the gradations of all the colored inks, an appropriate amount of image enhancing liquid can be applied at appropriate timing, and as a result, in the whole color space, hue-based gloss properties can be converged into the target ranges to uniform gloss properties of the whole of an image.

As described above, according to the present embodiment, at the time of, in the subsequent stage processing part J03, generating the pieces of multivalued data corresponding to the respective colored inks, the first multivalued data and second multivalued data for the image enhancing liquid are generated depend on values of the pieces of such multivalued data of colored inks. Then, by after quantizing the two pieces of multivalued data, using the different mask patterns to perform the multipass printing, timing to print the image enhancing liquid and an amount of the image enhancing liquid can be appropriately adjusted. As a result, independently of a gradation or hue, a uniform image having no gloss unevenness can be obtained over the whole gamut.

(Second Embodiment)

It is assumed that, in the present embodiment, the ink jet printing apparatus described with FIGS. 1A to 4 is also used to perform the image processing according to the block diagram illustrated in FIG. 7. However, in the present embodiment, an image is printed by 6-pass multipass printing.

Figure 16A:
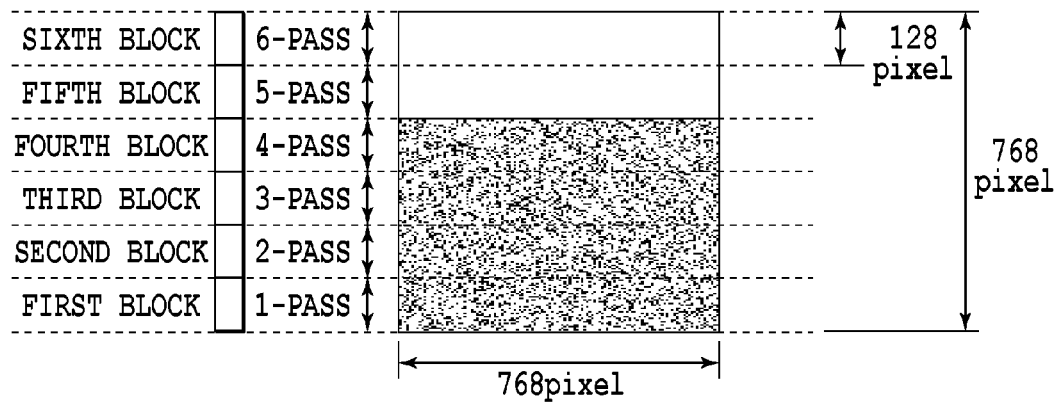
FIGS. 16A and 16B are diagrams illustrating mask patterns in a second embodiment.
Figure 16B:
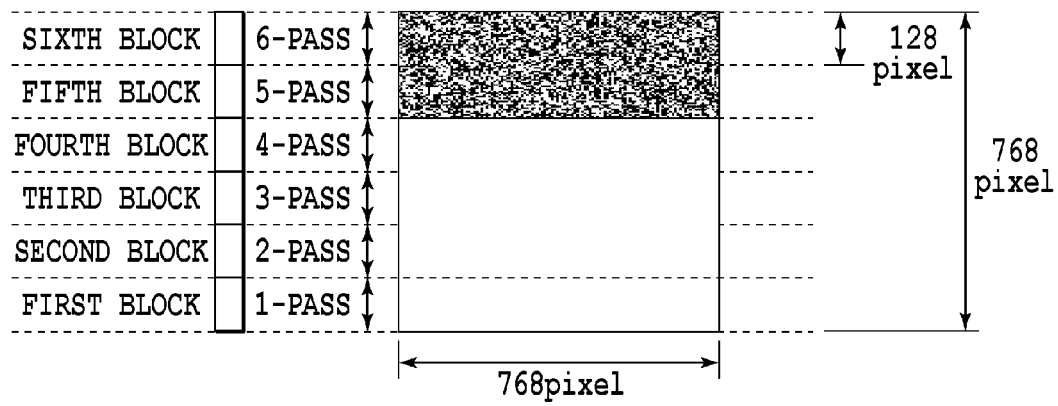

FIGS. 16A and 16B are diagrams illustrating mask patterns used in the mask processing parts J08 of the present embodiment. FIG. 16A illustrates the mask pattern for the six colored inks and CL1, which is used in the mask processing part J08a, whereas FIG. 16B illustrates the mask pattern for CL2, which is used in the mask processing part J08b. In the case of the 6-pass multipass printing, 768 nozzles included in each of the nozzle arrays are divided into 6 blocks each having 128 nozzles, and the respective blocks are assigned with mask patterns having a mutually complementary relationship. Referring to FIG. 16A, the colored inks and CL1 are, in the first to fourth block, assigned with mask patterns that have a mutually complementary relationship and print allowable rates of 25%, whereas print allowable rates of the fifth and sixth blocks are 0%. Also, referring to FIG. 16B, regarding CL2, print allowable rates of the first to fourth blocks are 0%, whereas the fifth and sixth blocks are assigned with mask patterns that have a mutually complementary relationship and print allowable rates of 50%.

Figure 17:
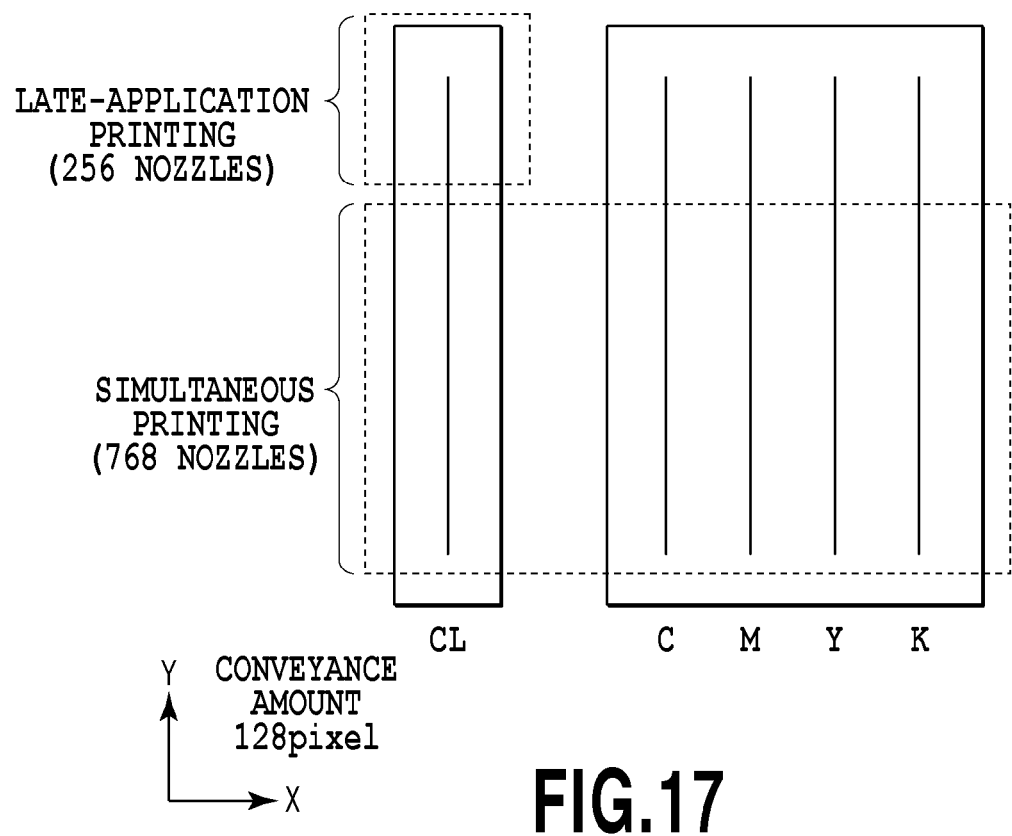
FIG. 17 is a diagram illustrating nozzle areas actually used for printing in the second embodiment.

FIG. 17 is a diagram illustrating nozzle areas actually used for printing in the respective nozzle arrays as a result of using the above mask patterns to perform the mask process. The nozzle arrays for the colored inks use the mask pattern illustrated in FIG. 16A, and therefore each nozzle area where an ejection operation is actually performed corresponds to four blocks (512 nozzles) from below. On the other hand, the nozzle array for the image enhancing liquid uses a logical addition of both of the mask patterns illustrated in FIGS. 16A and 16B, and therefore actually the entire nozzle area (768 nozzles) is used to perform an ejection operation. At this time, in a four block area from below, an ejection operation based on binary data CL1' converted from first multivalued data CL1 is performed, and the image enhancing liquid is applied on a print medium at the same timing as that for the colored inks. On the other hand, in a two block area from above, an ejection operation based on binary data CL2' converted from second multivalued data CL2 is performed to apply the image enhancing liquid on a layer of the already printed colored inks and image enhancing liquid.

According to the present embodiment as described, each of the colored inks and the CL1 data for the image enhancing liquid is printed during 4-pass multipass printing by 768 nozzles. On the other hand, the CL2 data for the image enhancing liquid is printed during 2-pass multipass printing by 256 nozzles. In general, multipass printing is a printing method for reducing stripes and unevenness of an image printed with colored ink, and it can be said that an effect thereof increases as the number of multiple passes (the number of print scans in the same image area) is increased. However, on the other hand, there is a disadvantage that as the number of multiple passes is increased, a time associated with printing increases to reduce throughput. Accordingly, in the case of using both of the colored inks and the image enhancing liquid to perform the multipass printing, it is preferable to, while making the number of multiple passes for the colored inks as large as possible, keep the number of multiple passes for the image enhancing liquid with which a problem caused by stripes and unevenness hardly occurs as small as possible. From such a perspective, in the present embodiment, by using the mask patterns as illustrated in FIGS. 16A and 16B, while the number of multiple passes for CL2 is kept at 2 passes, the number of multiple passes for the colored inks and CL1 is increased to 4 passes. This enables image quality of the colored inks to be improved more than that in the first embodiment.

(Third Embodiment)

In the present embodiment, the ink jet printing apparatus described with FIGS. 1A to 4 is also used to perform the image processing according to the block diagram illustrated in FIG. 7. However, in the present embodiment, described is the case of performing printing not on glossy paper but on semi-glossy paper.

In the case of the semi-glossy paper, original glossiness, i.e., glossiness of blank areas of the paper is lower than that of the glossy paper; however, difference in glossiness between areas applied with pigment ink and blank areas of the paper is not very large, and gloss unevenness is rather unnoticeable in many cases. In such a case, an amount of consuming the image enhancing liquid that does not contribute to an actual image is preferably kept as small as possible, and in the present embodiment, for signal value conversion in the subsequent stage processing part, a table different from that for the glossy paper is prepared.

Figure 18A:
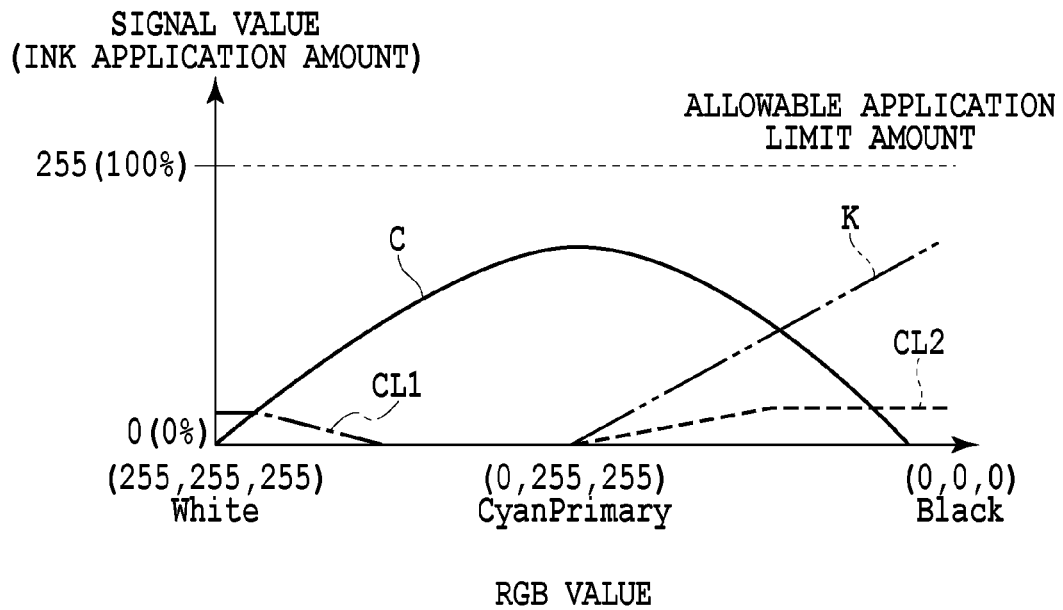
FIGS. 18A and 18B are diagrams illustrating signal value conversion in a subsequent stage processing part and a variation in glossiness in a third embodiment.
Figure 18B:
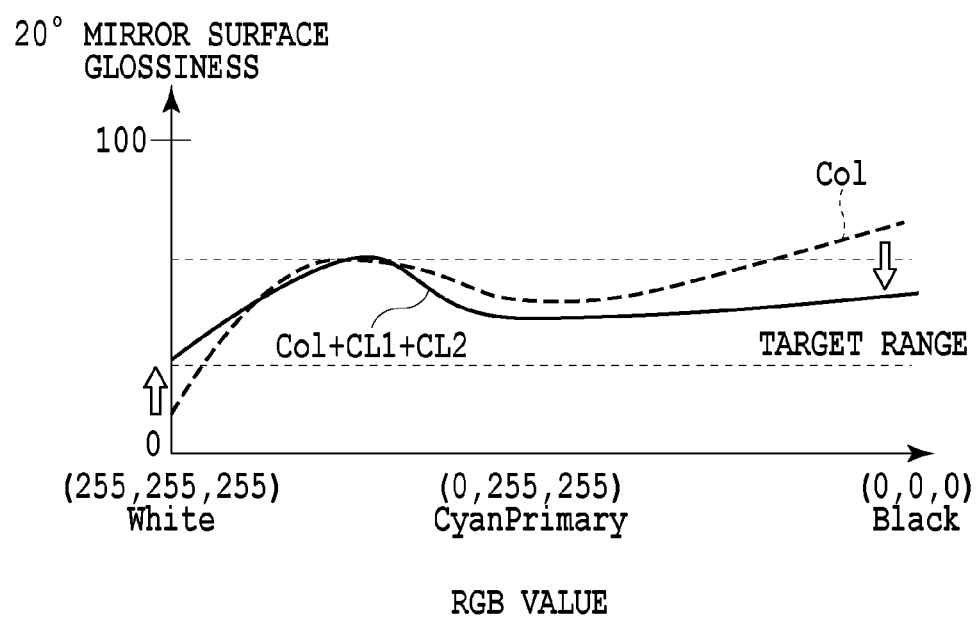

FIGS. 18A and 18B are diagrams for explaining signal value conversion performed in the subsequent stage processing part J03 of the present embodiment, and a variation in glossiness in the case of performing the signal value conversion. The horizontal axes represent the same cyan line signal values as that in FIG. 8 or 14A. In the case of the semi-glossy paper, even in the case of performing printing only with colored ink, as indicated by a dashed line in FIG. 18B, the glossiness is not so much out of the target range. In particular, in intermediate density where in the case of the glossy paper, the glossiness largely exceeds the target range, the glossiness of the semi-glossy paper falls within the target range. For this reason, in the present embodiment, as illustrated in FIG. 18A, CL1 that increases glossiness in a highlight part, and CL2 that suppresses glossiness in a high density part are generated; however, in the intermediate density area where gloss unevenness is within a target range, the signal value conversion to keep a signal value for image enhancing liquid at zero is performed. By such minimum application of the image enhancing liquid, as illustrated in FIG. 18B, in any of the density areas, the glossiness can be kept within the target range.

Note that values of pieces of multivalued data (C, M, Y, K, LC, LM) converted from input signal values (R, G, B) and values of CL1 and CL2 are typically different depending on the type of a print medium, or the like, too. Accordingly, the present embodiment is adapted to store a plurality of LUTs for the subsequent stage process in the storage part of the host device 110, and select an appropriate table on the basis of the type of a print medium and image information in print control information. Also, the adjustment of an amount of the image enhancing liquid to an appropriate amount as described above is preferably made not only for the glossy paper or semi-glossy paper but for any print medium. In this case, for example, regarding plain paper or matte paper that intrinsically does not have gloss, the present invention may be adapted not to generate CL1 or CL2, and not to apply the image enhancing liquid at all.

(Fourth Embodiment)

In each of the above-described embodiments, the description is provided using the configuration that in order to suppress gloss unevenness, prints both of the colored inks and the image enhancing liquid mainly by the 4-pass or 6-pass multipass printing. However, providing a print scan that prints the image enhancing liquid after a print scan using the colored inks takes more print time although enabling gloss unevenness to be reduced. Therefore, the present embodiment is configured to, while being intended for the same glossy paper, prepare a gloss evenness emphasizing mode (first mode) that gives priority to a reduction in gloss unevenness and a speed emphasizing mode (second mode) that gives priority to print speed, and enable any of them to be selected by a user depending on the intended use.

In the present embodiment, the ink jet printing apparatus described with FIGS. 1A to 4 is also used to perform the image processing according to the block diagram illustrated in FIG. 7. Also, in the case of selecting the gloss evenness emphasizing mode, an image is outputted in the same manner as in the first embodiment. On the other hand, in the case of selecting the speed emphasizing mode, an image is printed in a manner different from that in any of the above-described embodiments.

Figure 19A:
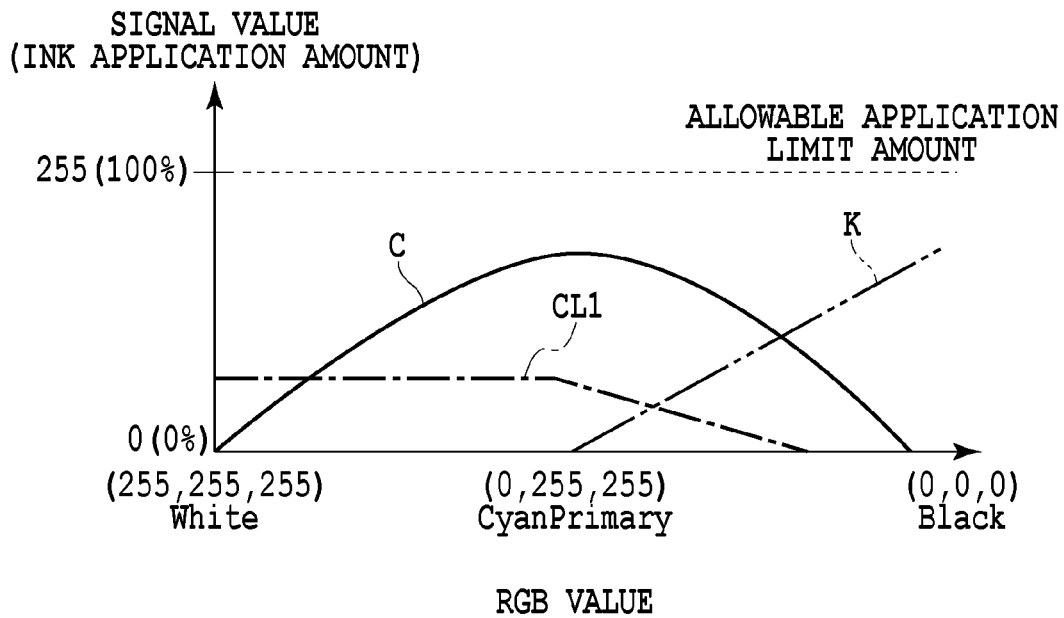
FIGS. 19A and 19B are diagrams illustrating signal value conversion in a subsequent stage processing part and a variation in glossiness in a fourth embodiment.
Figure 19B:
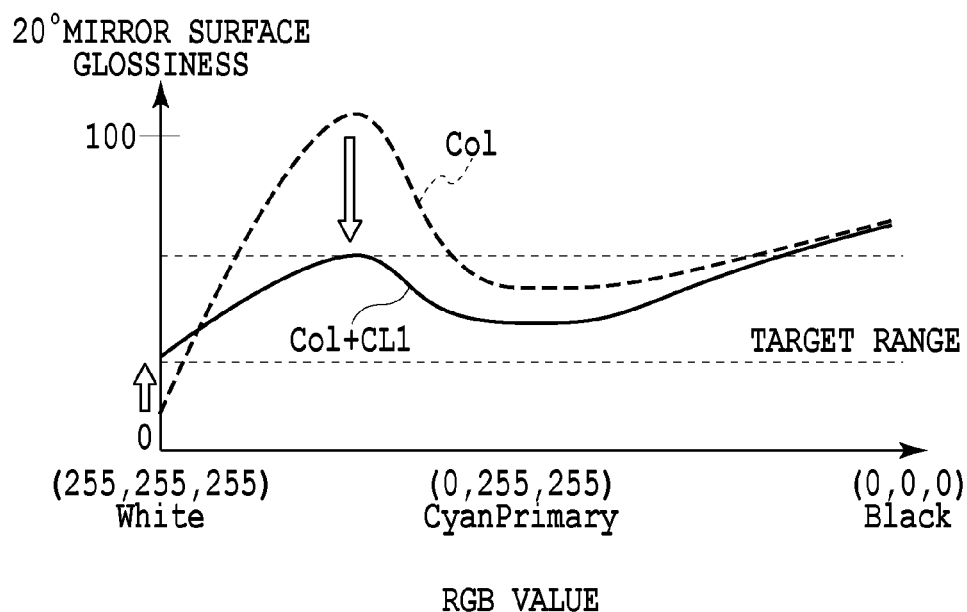

FIGS. 19A and 19B are diagrams illustrating signal value conversion performed in the subsequent stage processing part J03 in the case of selecting the speed emphasizing mode, and a variation in glossiness in the case of performing the signal value conversion. Referring to FIG. 19A, in the present embodiment, only CL1 data for performing printing during the same scan as that for the colored inks is generated, but CL2 data is not generated. Also, in the present embodiment, 2-pass multipass printing is employed for both of the colored inks and the image enhancing liquid.

Figure 20A:
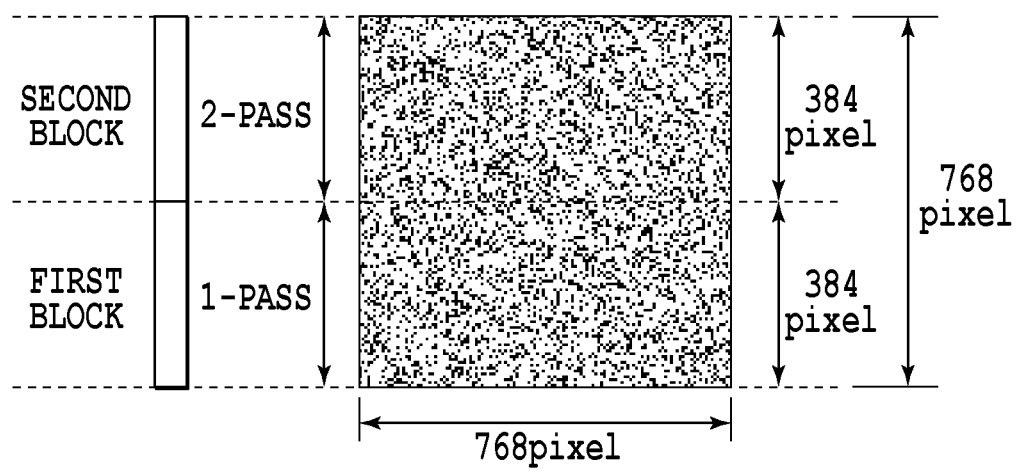
FIGS. 20A and 20B are diagrams illustrating a mask pattern in a speed emphasizing mode, and nozzle areas used.
Figure 20B:
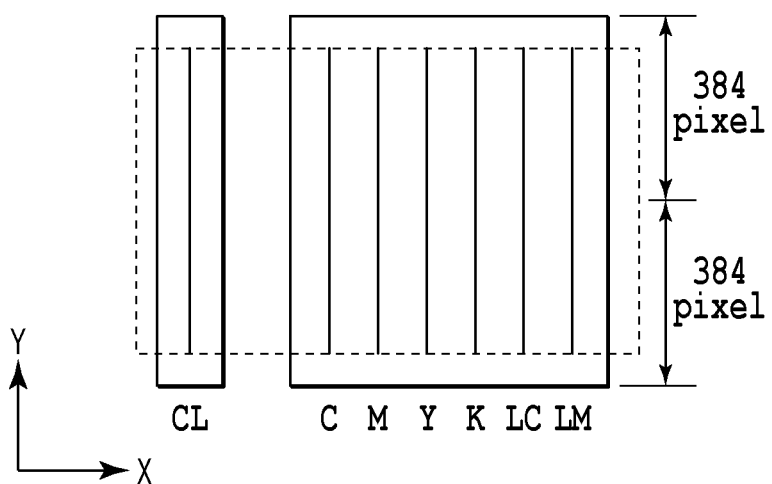

FIGS. 20A and 20B are diagrams illustrating a mask pattern used in the speed emphasizing mode of the present embodiment, and nozzle areas actually used for printing. In the case of the 2-pass multipass printing, 768 nozzles included in each of the nozzle arrays are divided into two blocks each having 384 nozzles, and the respective blocks are assigned with mask patterns that have a mutually complementary relationship and print allowable rates of 50%. In the present embodiment, it is not necessary to prepare a print scan for applying the image enhancing liquid after having printed the colored inks, and therefore all the nozzles included in the nozzle arrays for the colored inks can be used for a print operation. As a result, as compared with the gloss evenness emphasizing mode, printing can be completed in a short period of time.

However, in the speed emphasizing mode of the present embodiment, it is not possible that the colored ink layer is overcoated with the image enhancing liquid as described with FIG. 6F, and therefore as illustrated in FIG. 19B, in at high density, there occurs an area where the glossiness exceeds the target range.

As described above, the present embodiment prepares the two mode, i.e., the gloss evenness emphasizing mode that while taking print time, suppresses gloss unevenness over the whole gamut, and the speed mode that while making the glossiness exceeding the target range at high density, enables output in a short period of time. This enables the user to select a preferred mode depending on the intended use of an output, or circumstances of the user to obtain a desired printed material.

(Fifth Embodiment)

Figure 21:
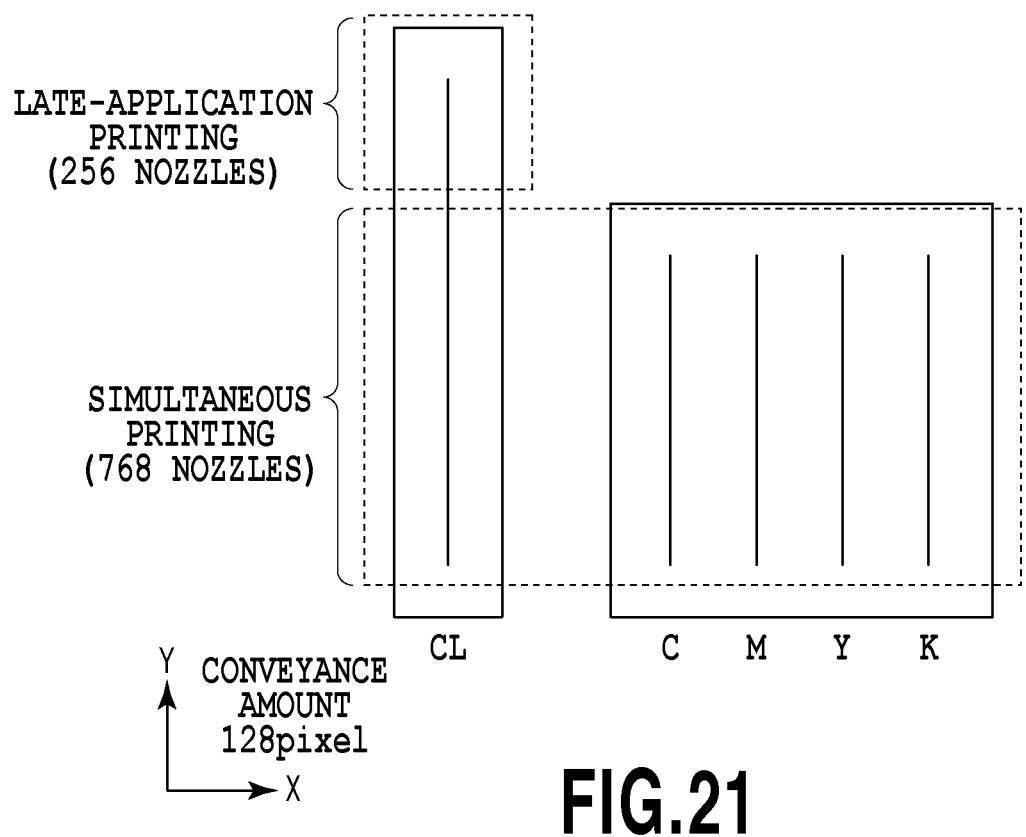
FIG. 21 is a diagram illustrating an array configuration of nozzle arrays, and nozzle areas used in a fifth embodiment.

FIG. 21 is a diagram illustrating an array configuration of nozzle arrays of a print head used in the present embodiment, and nozzle areas actually used for printing. In the present embodiment, a nozzle array for image enhancing liquid is made longer than those for colored inks, and an area protruding from the nozzle arrays for the colored inks is used to perform a print scan for CL2. The diagram illustrates the case where each of the nozzle arrays for the colored inks has 768 nozzles, whereas the nozzle array for the image enhancing liquid has 1024 nozzles, and printing is performed by 6-pass multipass printing for the colored inks and CL1 data and 2-pass multipass printing for CL2 data.

In any of the above-described embodiments, as illustrated in FIG. 2, the nozzle array for the image enhancing liquid and the nozzle arrays for the colored inks are the same in length, and therefore all the nozzles for the colored inks cannot be used for printing. However, in the case where, as in the present embodiment, the nozzle array for the image enhancing liquid is preliminarily configured to be longer, all the nozzles for the colored inks can be used for printing. As a result, even in the case of having a mode using the image enhancing liquid and a mode not using the image enhancing liquid together, a print use area in a nozzle array for each of the colored inks is not changed for each of the modes, and an ejection condition of the colored ink can be stabilized for all the nozzles.

(Sixth Embodiment)

In any of the above-described embodiments, in order to suppress gloss unevenness, the colorless and transparent image enhancing liquid is prepared separately from the colored inks. On the other hand, the present embodiment is characterized by making some of the colored inks respectively containing color materials have a role as the image enhancing liquid. Here, as an example, described is the case of using light cyan (LC) ink as the image enhancing liquid.

Figure 22:
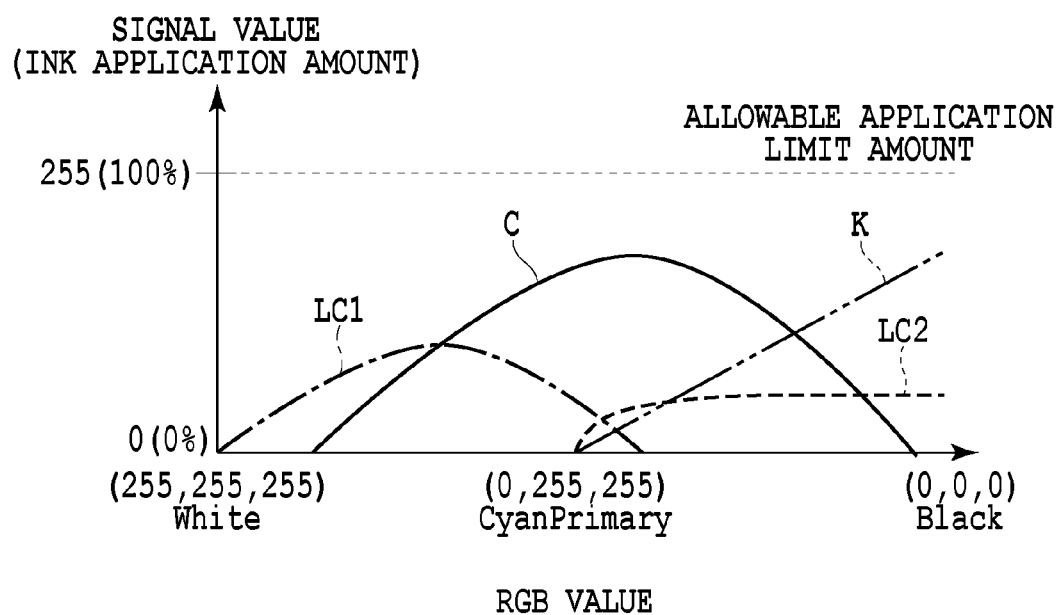
FIG. 22 is a diagram explaining an example of signal value conversion performed in a subsequent stage processing part in a sixth embodiment.

FIG. 22 is a diagram explaining an example of signal value conversion performed in a subsequent stage processing part J03 of the present embodiment. The horizontal axis represents the same cyan line signal value as those in the above-described embodiments. In the present embodiment, in order to express gradations of a cyan line, in addition to cyan ink and black ink, the light cyan ink is also used. The light cyan ink is ink that has lower pigment concentration and higher lightness than the cyan ink. For this reason, at gradations from white to cyan intermediate density, the light cyan is used from an area closer to white as compared with the cyan, and a use amount thereof gradually decreases as the cyan signal value is increased. In the present embodiment, the light cyan having such a locus is treated as the above-described CL1 data for the image enhancing liquid. That is, referring to FIG. 7, the CL1 data of the present embodiment is subjected to the quantizing process in the quantization processing part J05a; subjected to the mask process in J08a; and printed at the same timing as the other colored inks.

On the other hand, at gradations from a single color area of cyan to a black area, a normal color conversion process does not generate light cyan having high lightness; however, the present embodiment covers the action of the image enhancing liquid as described with FIG. 6F, and therefore generates predetermined light cyan data LC2. Also, referring to FIG. 7, the light cyan data LC2 is subjected to the quantization process in the quantization processing part J05b and the mask process in J08b, and thereby printed on a print medium during a print scan at timing later than that for the other colored inks.

As described above, in the present embodiment, as multivalued data for the light cyan ink that is part of the colored inks, LC1 for printing simultaneously with the other colored inks, and LC2 for printing after the other colored inks are generated. Then, after the two pieces of multivalued data have been quantized, different mask patterns are used to perform multipass printing, and thereby a uniform image having no gloss unevenness can be obtained independently of a gradation.

Further, any ink such as light magenta ink on a magenta line, gray ink on a gray line, or yellow ink can take a role respectively like the role of the light cyan in the gamut appropriate for the ink if the inks have relatively high lightness. As a result, without particularly preparing the colorless and transparent image enhancing liquid, a uniform image having no gloss unevenness over the whole gamut can be outputted.

Note that in any of the above-described embodiments, described is the case where as illustrated in the block diagram of FIG. 7, the host device performs the processing steps up to the quantization processing step, and the subsequent processing steps are performed by the printing apparatus; however, the present invention is not limited to such a configuration. For example, the present invention may be configured such that the host device performs the whole of the above-described image processing, and then transmits only print data to the printing apparatus, or in an opposite manner, may be configured such that the whole of the image processing subsequent to the prior stage process is performed by the printing apparatus. In the case of a system that performs the series of processing steps as described above, the processing steps may be performed by hardware or software. In either case, as long as the distinctive subsequent stage process and print method of the present invention as described in any of the above embodiments are performed, the whole of the system corresponds to the ink jet printing apparatus of the present invention.

Further, the present invention is also realized by program codes constituting a computer-readable program for realizing functions of the above-described image processing, or by a storage medium storing the program. In this case, the host device, or a computer (or CPU or MPU) of an image forming apparatus reads and executes the above program codes to thereby realize the above-described image processing. As described above, the computer readable program for instructing a computer to perform the above-described image processing, or the storage medium storing the program is also included in the present invention.

As the storage medium for supplying the program codes, for example, a floppy (registered trademark) disk, hard disk, optical disk, magneto-optical disk, CD-ROM, CD-R, magnetic tape, nonvolatile memory card, ROM, or the like can be used.

Also, the present invention may be adapted such that a computer executes the read program codes, and thereby in addition to realizing functions of any of the above-described embodiments, on the basis of instructions of the program codes, an OS running on the computer performs part or whole of actual processing. Further, the present invention may be adapted such that the program codes are written in a memory provided on a function enhancement board inserted into the computer or in a function enhancement unit connected to the computer, and then on the basis of instructions of the program codes, a CPU or the like performs part or whole of the actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106987, filed May 8, 2012 which is hereby incorporated by reference herein in its entirety.

What is claimed is:

1. An image processing apparatus for printing an image on a unit area of print medium by using a colored ink and clear liquid according to image data of the image corresponding to the unit area, the image processing apparatus comprising:
   a generation unit configured to, on a basis of the image data corresponding to the unit area, generate multivalued color data corresponding to the colored ink, and first multivalued data and second multivalued data that correspond to the clear liquid;
   a binarization unit configured to binarize the multivalued color data to generate binary color data, binarize the first multivalued data to generate first binary data, and binarize the second multivalued data to generate second binary data; and
   a determination unit configured to determine timings to print the colored ink and the clear liquid on the print medium, respectively, according to the binary color data, the first binary data, and the second binary data,
   wherein the determination unit is further configured to determine the timings to print the colored ink and the clear liquid on the print medium such that: (i) printing of the clear liquid according to the first binary data is performed at a timing before printing of the colored ink according to the binary color data is performed, and (ii) after the printing of the colored ink according to the binary color data and the printing of the clear liquid according to the first binary data on the print medium have been performed, printing of the clear liquid according to the second binary data is performed.

2. The image processing apparatus according to claim 1, wherein the generation unit generates a signal value of the first multivalued data so as to be higher than a signal value of the second multivalued data in an area where a signal value of the multivalued color data is relatively low, and in an area where the signal value of the multivalued color data is relatively high, generates the signal value of the first multivalued data so as to be lower than the signal value of the second multivalued data.

3. The image processing apparatus according to claim 2, wherein the generation unit is further configured to set the signal value of the first multivalued data to zero and the signal value of the second multivalued data to a value larger than zero in a case where the input image data represents black.

4. The image processing apparatus according to claim 1, wherein the image processing apparatus uses a serial type ink jet printing apparatus that alternates a print scan and a conveyance operation to thereby print an image on the print medium, the print scan moving a print head that includes nozzle arrays of which is each adapted to array in an array direction a plurality of nozzles ejecting a corresponding colored ink and a nozzle array adapted to array a plurality of nozzles ejecting the clear liquid,
   wherein the print head moves in the print scan in a direction intersecting with the array direction with respect to the print medium, and the conveyance operation conveys the print medium in a direction intersecting with the print scan, and
   wherein the determination unit is further configured to determine the timings to print the colored ink and the clear liquid on the print medium such that, on the print medium, the printing according to the binary color data and the printing according to the first binary data are performed during a same print scan, and the printing according to the second binary data is performed during a print scan after the printing according to the binary color data and the printing according to the first binary data have been performed.

5. The image processing apparatus according to claim 4, wherein the determination unit is further configured to determine the timings to print the colored ink and the clear liquid on the print medium by using mask patterns that, for each of the plurality of nozzles, respectively define pixels where printing is allowed during the print scans or pixels where printing is not allowed during the print scans.

6. The image processing apparatus according to claim 4, wherein the determination unit is further configured to determine the timings to print the colored ink and the clear liquid on the print medium such that, on the print medium, the printing according to the binary color data and the printing according to the first binary color data are performed in the same print scans a plurality of times, and the printing according to the second binary data is performed during a smaller number of times of print scans than the plurality of times.

7. The image processing apparatus according to claim 4, wherein the nozzle array ejecting the clear liquid is longer than the nozzle arrays ejecting the colored ink in the array direction.

8. The image processing apparatus according to claim 1, wherein the generation unit is further configured to differentiate the multivalued color data, the first multivalued data, and the second multivalued data generated on the basis of the input image data depending on a type of the print medium.

9. The image processing apparatus according to claim 1, further comprising:
   a unit configured to set a first mode that gives priority to image quality and a second mode that gives priority to print speed, wherein
   the generation unit is further configured to generate the multivalued color data, the first multivalued data, and the second multivalued data in a case where the first mode is set, and in a case where the second mode is set, generate the multivalued color data and the first multivalued data.

10. The image processing apparatus according to claim 1, wherein the clear liquid is a colorless and transparent liquid that contains no color material.

11. The image processing apparatus according to claim 1, wherein the clear liquid is a colored ink that contains color material.

12. The image processing apparatus according to claim 1, wherein the colored ink contains pigment as color materials, and the clear liquid is a liquid that improves gloss properties of a printed surface.

13. An image processing method for printing an image on a unit area of print medium by using a colored ink and a clear liquid according to image data of the image corresponding to the unit area, the image processing method comprising:
   a generation step of, on a basis of the input image data corresponding to the unit area, generating multivalued color data corresponding to the colored ink, and first multivalued data and second multivalued data that correspond to the clear liquid;
   a binarization step of binarizing the multivalued color data to generate binary color data, binarizing the first multivalued data to generate first binary data, and binarizing the second multivalued data to generate second binary data; and
   a determination step of determining timings to print the colored ink and the clear liquid on the print medium, respectively, according to the binary color data, the first binary data, and the second binary data, wherein the determination step determines the timings to print the colored ink and the clear liquid on the print medium such that: (i) printing of the clear liquid according to the first binary data is performed at a timing before printing of the colored ink according to the binary color data is performed, and (ii) after the printing of the colored ink according to the binary color data and the printing of the clear liquid according to the first binary data on the print medium have been performed, printing of the clear liquid according to the second binary data is performed.

14. An image processing apparatus for printing an image on a unit area of a print medium by using a colored ink and a clear liquid according to image data of the image corresponding to the unit area of the print medium, the image processing apparatus comprising:
  a generation unit configured to, on a basis of the image data corresponding to the unit area, generate first multivalued data and second multivalued data that correspond to the clear liquid; and
  an outputting unit configured to output first print data according to the first multivalued data generated by the generation unit and second print data according to the second multivalued data generated by the generation unit, the first print data and the second print data being used for applying the clear liquid by a printing unit configured to apply the clear liquid to the print medium,
  wherein the printing of the clear liquid to the unit area based on the first print data is performed at a timing before printing of the colored ink to the unit area, and after printing of the colored ink and the clear liquid, based on the first print data, to the unit area have been completed printing of the clear liquid based on the second print data is performed.

15. The image processing apparatus according to claim 14, wherein the generation unit is further configured to generate multivalued color data corresponding the colored ink.

16. The image processing apparatus according to claim 14, further comprising:
  a binarization unit configured to binarize the first multivalued data and the second multivalued data.

17. The image processing apparatus according to claim 15, wherein, in a case of color reproduction for a color having a specific hue, the generation unit is further configured to generate a signal value of the first multivalued data that is higher than a signal value of the second multivalued data in an area where a signal value of the multivalued color data is lower than a predetermined value, and
  in an area where the signal value of the multivalued color data is higher than the predetermined value, generate the signal value of the first multivalued data that is lower than the signal value of the second multivalued data.

18. The image processing apparatus according to claim 17, wherein the generation unit is further configured to set the signal value of the first multivalued data to zero and the signal value of the second multivalued data to a value larger than zero in a case where the input image data represents black.

19. The image processing apparatus according to claim 14, wherein the image processing apparatus uses a serial type ink jet printing apparatus that alternates a print scan and a conveyance operation to thereby print an image on the print medium, the print scan moving a printing unit that includes nozzle arrays each of which is adapted to array in an array direction a plurality of nozzles ejecting a corresponding colored ink and a nozzle array adapted to array a plurality of nozzles ejecting the clear liquid,
  wherein the print head moves in the print scan in a direction intersecting with the array direction with respect to the print medium, and the conveyance operation conveys the print medium in a direction intersecting with the print scan, and
  wherein the determination unit is further configured to determine the timings to print the colored ink and the clear liquid on the print medium such that, on the print medium, the printing according to color print data and the printing according to the first print data are performed during a same print scan, and the printing according to the second print data is performed during a print scan after the printing according to the color print data and the printing according to the first print data have been performed.

20. The image processing apparatus according to claim 19, wherein
  nozzles used for printing the color ink are nozzles in a restricted region of the nozzle array of the colored ink, located upstream in the conveyance direction,
  nozzles used for printing the clear liquid based on the first print data are nozzles in a region of the nozzle array of the clear liquid corresponding to the restricted region, and
  nozzles used for printing the clear liquid based on the second print data are nozzles in a region located downstream with respect to the restricted region of the nozzle array of the clear liquid.

21. The image processing apparatus according to claim 14, wherein the clear liquid is a colorless and transparent liquid that contains no color material.

22. The image processing apparatus according to claim 14, wherein the clear liquid is a colored ink that contains color material.

23. The image processing apparatus according to claim 14, wherein the colored ink contains pigment as color materials, and the clear liquid is a liquid that improves gloss properties of a printed surface.

* * * * *